(12) United States Patent
Mepham et al.

(10) Patent No.: US 12,715,276 B2
(45) Date of Patent: Aug. 25, 2026

(54) ELECTRIFIED AXLE ASSEMBLY

(71) Applicant: Allison Transmission, Inc., Indianapolis, IN (US)

(72) Inventors: Shaun Mepham, Clarkston, MI (US); Christopher G. Baillie, Lake Orion, MI (US); James A. Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/902,820

(22) Filed: Sep. 30, 2024

(65) Prior Publication Data

US 2025/0018781 A1 Jan. 16, 2025

Related U.S. Application Data

(63) Continuation of application No. 17/701,630, filed on Mar. 22, 2022, now Pat. No. 12,103,373.

(Continued)

(51) Int. Cl.

| | |
|---|---|
| ***B60K 17/08*** | (2006.01) |
| ***B60K 1/02*** | (2006.01) |
| ***B60K 17/16*** | (2006.01) |
| ***F16H 37/04*** | (2006.01) |
| ***F16H 37/08*** | (2006.01) |

(52) U.S. Cl.

CPC ................ *B60K 1/02* (2013.01); *B60K 17/08* (2013.01); *B60K 17/165* (2013.01); *F16H 37/043* (2013.01); *F16H 37/0806* (2013.01)

(58) Field of Classification Search

CPC ........ B60K 1/02; B60K 17/08; B60K 17/165; F16H 37/043; F16H 37/0806

See application file for complete search history.

(56) References Cited

U.S. PATENT DOCUMENTS

| | | |
|---|---|---|
| 4,799,564 A | 1/1989 | Iijima et al. |
| 7,261,660 B2 | 8/2007 | Sowul et al. |

(Continued)

FOREIGN PATENT DOCUMENTS

| | | |
|---|---|---|
| CN | 102878255 B * | 9/2015 |
| CN | 104972890 A * | 10/2015 |

(Continued)

OTHER PUBLICATIONS

International search report and written opinion for International Application No. PCT/US2022/021439, Jul. 1, 2022, 9 pages.

(Continued)

*Primary Examiner* — William C Joyce

(74) *Attorney, Agent, or Firm* — Barnes & Thornburg LLP

(57) ABSTRACT

An electrified axle assembly includes a first and second motor, a first and second idler shaft, and one or more output shafts mechanically engaged with the first and/or second idler shafts and one or more axles. In some embodiments, the electrified axle assembly may include two output shafts, with each output shaft meshed with a corresponding one of the idler shafts and a corresponding one of the axles. In other embodiments, the electrified axle assembly may include a single output shaft meshed with each of the idler shaft and each axle. Additional single motor and single and dual speed embodiments are also disclosed.

18 Claims, 28 Drawing Sheets

Related U.S. Application Data

(60) Provisional application No. 63/197,313, filed on Jun. 4, 2021, provisional application No. 63/165,718, filed on Mar. 24, 2021, provisional application No. 63/164,086, filed on Mar. 22, 2021.

(56) References Cited

U.S. PATENT DOCUMENTS

| | | | |
|---|---|---|---|
| 7,297,083 | B2 | 11/2007 | Duncan |
| 10,919,385 | B2 | 2/2021 | Kumar et al. |
| 11,738,629 | B2 | 8/2023 | Ping et al. |
| 2003/0111280 | A1 | 6/2003 | Platner et al. |
| 2009/0014223 | A1 | 1/2009 | Jones et al. |
| 2019/0047530 | A1 | 2/2019 | Nagel et al. |
| 2019/0120350 | A1 | 4/2019 | Zhong et al. |
| 2019/0331200 | A1 | 10/2019 | Barendrecht |
| 2020/0180426 | A1 | 6/2020 | Chopra et al. |
| 2020/0263770 | A1 | 8/2020 | Klurfeld et al. |
| 2020/0292042 | A1 | 9/2020 | Engerman et al. |

FOREIGN PATENT DOCUMENTS

| | | | | | |
|---|---|---|---|---|---|
| CN | 208148961 | U | * | 11/2018 | |
| CN | 109466297 | A | | 3/2019 | |
| CN | 109649140 | A | | 4/2019 | |
| CN | 209365878 | U | | 9/2019 | |
| CN | 111108012 | A | | 5/2020 | |
| CN | 211231459 | U | | 8/2020 | |
| CN | 112172518 | A | | 1/2021 | |
| CN | 114161878 | A | | 3/2022 | |
| DE | 102015101042 | A1 | | 7/2016 | |
| DE | 102020201291 | A1 | | 8/2021 | |
| EP | 3756920 | A1 | | 12/2020 | |
| EP | 4060204 | A1 | | 9/2022 | |
| FR | 3053007 | A1 | * | 12/2017 | ............... B60K 1/02 |
| JP | 2017203503 | A | | 11/2017 | |
| KR | 20190112295 | A | | 10/2019 | |
| WO | 1998035848 | A2 | | 8/1998 | |
| WO | WO-2019019292 | A1 | * | 1/2019 | ............... B60K 1/02 |
| WO | 2020179202 | A1 | | 9/2020 | |

OTHER PUBLICATIONS

International Preliminary Report on Patentability and Written Opinion for International Application No. PCT/US2022/021439, issued Sep. 12, 2023, 7 pgs.

Search report for application GB2418449.1 dated Apr. 16, 2025, 5 pages.

Extended European Search Report in application No. 22776527.8 dated May 2, 2025, 30 pages.

* cited by examiner

ELECTRIFIED AXLE ASSEMBLY

CROSS-REFERENCE TO RELATED U.S. PATENT APPLICATION

The present application is a continuation of, and claims priority 35 U.S.C. § 120 to, U.S. patent application Ser. No. 17/701,630 entitled "Electrified Axle Assembly" by Mepham et al., now U.S. Pat. No. 12,103,373, which was filed on Mar. 22, 2022, and which claims priority under 35 U.S.C. § 119(e) to U.S. Provisional Application Ser. No. 63/164,086 filed on Mar. 22, 2021, U.S. Provisional Application Ser. No. 63/165,718 filed on Mar. 24, 2021, and U.S. Provisional Application Ser. No. 63/197,313 filed on Jun. 1, 2021, the entire disclosures of each of which are incorporated herein by reference.

FIELD OF THE DISCLOSURE

The present disclosure relates generally to vehicle axles and, more particularly, to electrified axle assemblies.

BACKGROUND

The drive train of many vehicles includes one or more axle assemblies, which transfer mechanical power from the vehicle's engine to the wheels of the corresponding vehicle to thereby move the vehicle. Each axle assembly generally includes a pair of axles mechanically coupled to a wheel of the vehicle. The drive train also typically includes a gear set, which may provide a selectable gear reduction for the vehicle. Electrical or electrified axle assemblies differ from standard axle assemblies in that they include, or are otherwise mechanically powered by, an electric motor.

SUMMARY

According to an aspect of the present disclosure, an electrified axle assembly may include a first motor, a second motor arranged coplanar with the first motor, a first idler shaft mechanically engaged with the first motor, a first output shaft mechanically engaged with the first idler shaft and a first axle, a second idler shaft mechanically engaged with the second motor, and a second output shaft mechanically engaged with the second idler shaft and a second axle different from the first axle.

In some embodiments, the first idler shaft may include a drive wheel meshed with a pinion of the first motor, a first idler gear meshed with a first output gear of the first output shaft, and a second idler gear meshed with a second output gear of the first output shaft. In such embodiments, the first idler gear may define a first gear ratio and the second idler gear defines a second gear ratio different from the first gear ratio. Additionally, in some embodiments, the second idler shaft may include a drive wheel meshed with a pinion of the second motor, a first idler gear meshed with a first output gear of the second output shaft, and a second idler gear meshed with a second output gear of the second output shaft. In such embodiments, the first idler gear of the second idler shaft may define the first gear ratio and the second idler gear of the second idler shaft defines the second gear ratio.

Additionally, in some embodiments, the electrified axle assembly may further include a first planetary gear set mechanically coupled between the first output shaft and the first axle and a second planetary gear set mechanically coupled between the second output shaft and the second axle. In such embodiments, the first output shaft may form a portion of the first planetary gear set and the second output shaft may form a portion of the second planetary gear set.

In some embodiments, the electrified axle assembly may also include a first planetary gear set mechanically coupled between the first output shaft and the first axle. In such embodiments, the first output shaft may include a sun gear of the first planetary gear set. Additionally, the first planetary gear set may further include a plurality of planet gears meshed with the sun gear of the first output shaft and a ring gear of the first planetary gear set. The electrified axle assembly may further include a pair of roller bearings positioned between the first output shaft and a planet carrier of the first planetary gear set.

Additionally, in some embodiments, the electrified axle assembly may also include a second planetary gear set mechanically coupled between the second output shaft and the second axle. In such embodiments, the second output shaft may include a sun gear of the second planetary gear set. Additionally, the second planetary gear set may further include a plurality of planet gears meshed with the sun gear of the second output shaft and a ring gear of the second planetary gear set. The electrified axle assembly may further include a pair of roller bearings positioned between the second output shaft and a planet carrier of the second planetary gear set.

Furthermore, in some embodiments, the first motor may define a first shaft, the second motor may define a second shaft, the first idler shaft may define a third shaft, the first output shaft may define a fourth shaft, the second idler shaft may define a fifth shaft, the second output shaft may define a sixth shaft, the first axle may define a seventh shaft, and the second axle may define an eighth shaft. In such embodiments, each of the first, second, third, fourth, fifth, sixth, seventh, and eight shafts may be parallel with each other. For example, each of the first, second, third, fourth, fifth, sixth, seventh, and eight shafts may be coplanar with each other.

According to another aspect of the present disclosure, an electrified axle assembly may include a first motor, a second motor arranged coplanar with the first motor, a first idler shaft mechanically engaged with the first motor, a second idler shaft mechanically engaged with the second motor, a differential mechanically engaged with each of a first axle and a second axle, and an output shaft mechanically engaged with each of the first idler gear, the second idler, and the differential.

In some embodiments, the first idler shaft may include a drive wheel meshed with a pinion of the first motor, a first idler gear meshed with a first output gear of the output shaft, and a second idler gear meshed with a second output gear of the output shaft. Additionally, in some embodiments, the second idler shaft may include a drive wheel meshed with a pinion of the second motor, a first idler gear meshed with the first output gear of the output shaft, and a second idler gear meshed with the second output gear of the output shaft. In such embodiments, the first idler gear of the first and second idler shafts may define a first gear ratio and the second idler gear of the first and second idler shafts may define a second gear ratio different from the first gear ratio.

Additionally, in some embodiments, the electrified axle assembly may further include a planetary gear set mechanically coupled between the output shaft and the differential. In such embodiments, the first output shaft may further include a sun gear of the planetary gear set. Additionally, the planetary gear set may further include a plurality of planet gears meshed with the sun gear of the output shaft and a ring gear of the planetary gear set. Furthermore, in such embodiments, the electrified axle assembly may include a pair of roller bearings positioned between the output shaft and a planet carrier of the planetary gear set.

In some embodiments, the first motor may define a first shaft, the second motor may define a second shaft, the first idler shaft may define a third shaft, the second idler shaft may define a fourth shaft, the output shaft may define a fifth shaft, the first axle may define a sixth shaft, and the second axle may define an seventh shaft. In such embodiments, each of the first, second, third, fourth, fifth, sixth, and seventh shafts may be parallel with each other. For example, each of the first, second, third, fourth, fifth, sixth, and seventh shafts may be coplanar with each other.

Additionally, in some embodiments, the first motor, the second motor, the first axle, and the second axle may be coplanar with each other. In such embodiments, the first axle and second axle may be located between the first motor and the second motor. Additionally, in some embodiments, a pinion of the first motor may face a first direction and a pinion of the second motor may also face the first direction.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DESCRIPTION OF THE DRAWINGS

Figure 1:
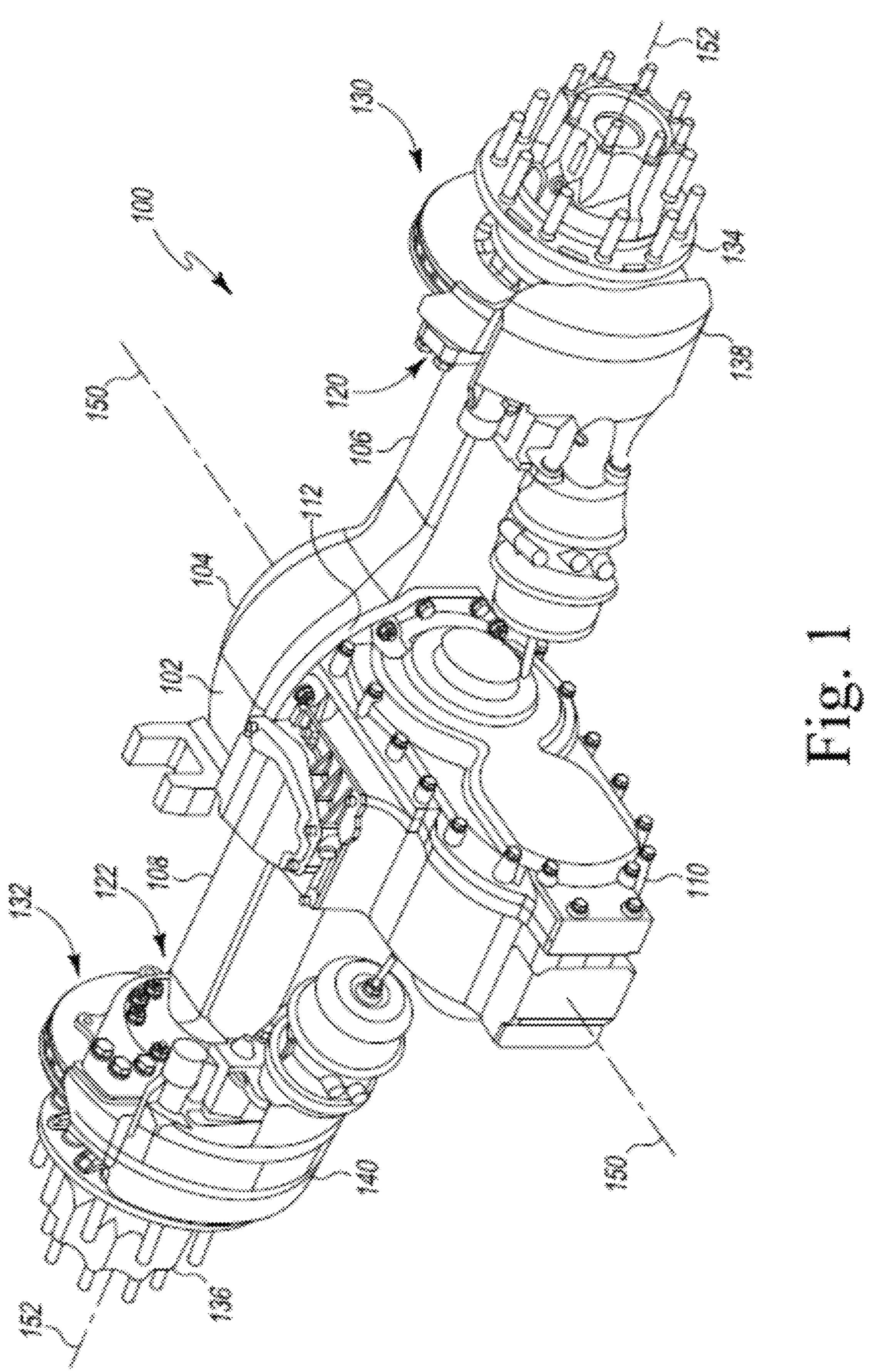
FIG. 1 is a top perspective view of an embodiment of an electrified axle assembly.
Figure 2:
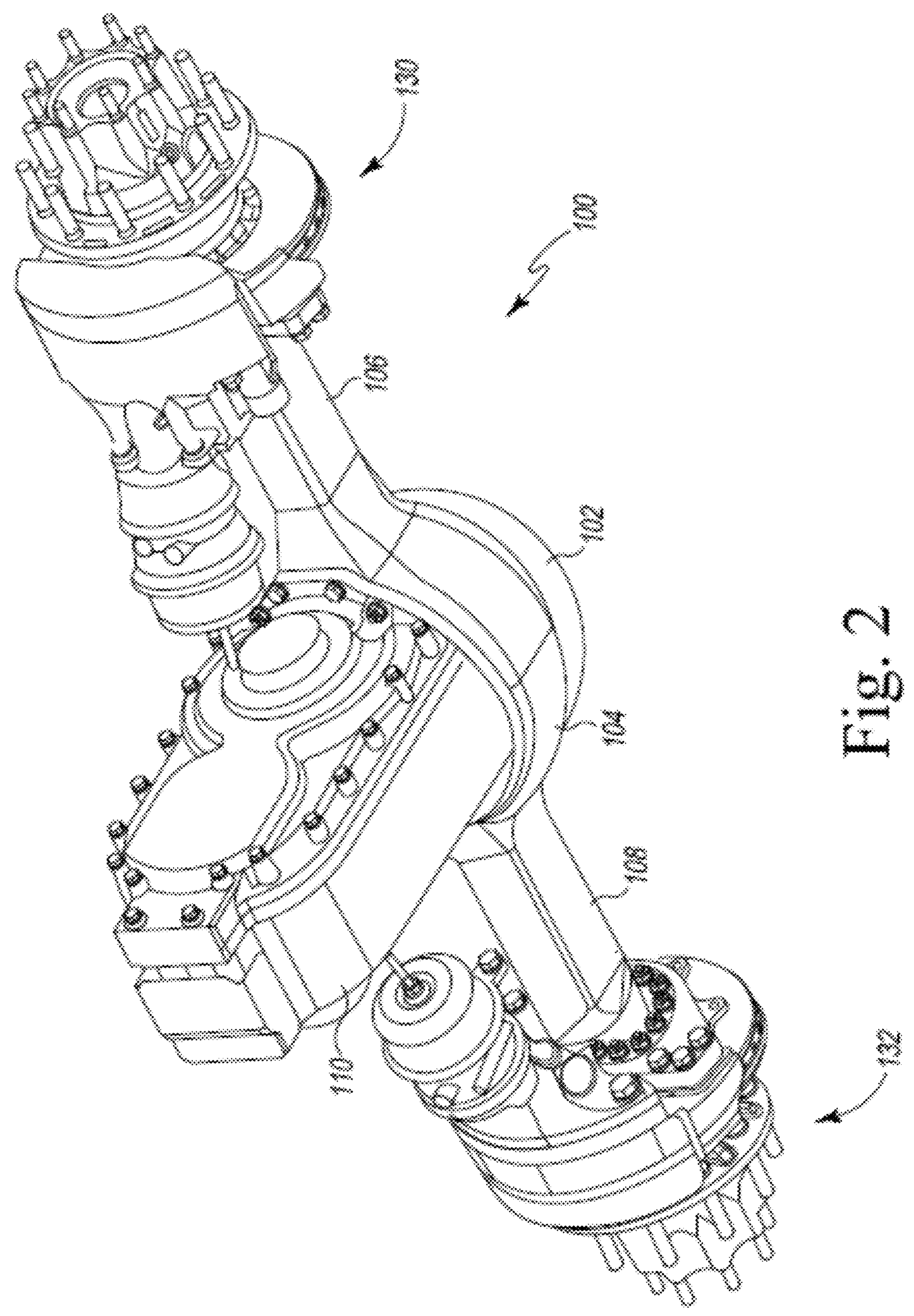
FIG. 2 is a bottom perspective view of the electrified axle assembly of FIG. 1.
Figure 3:
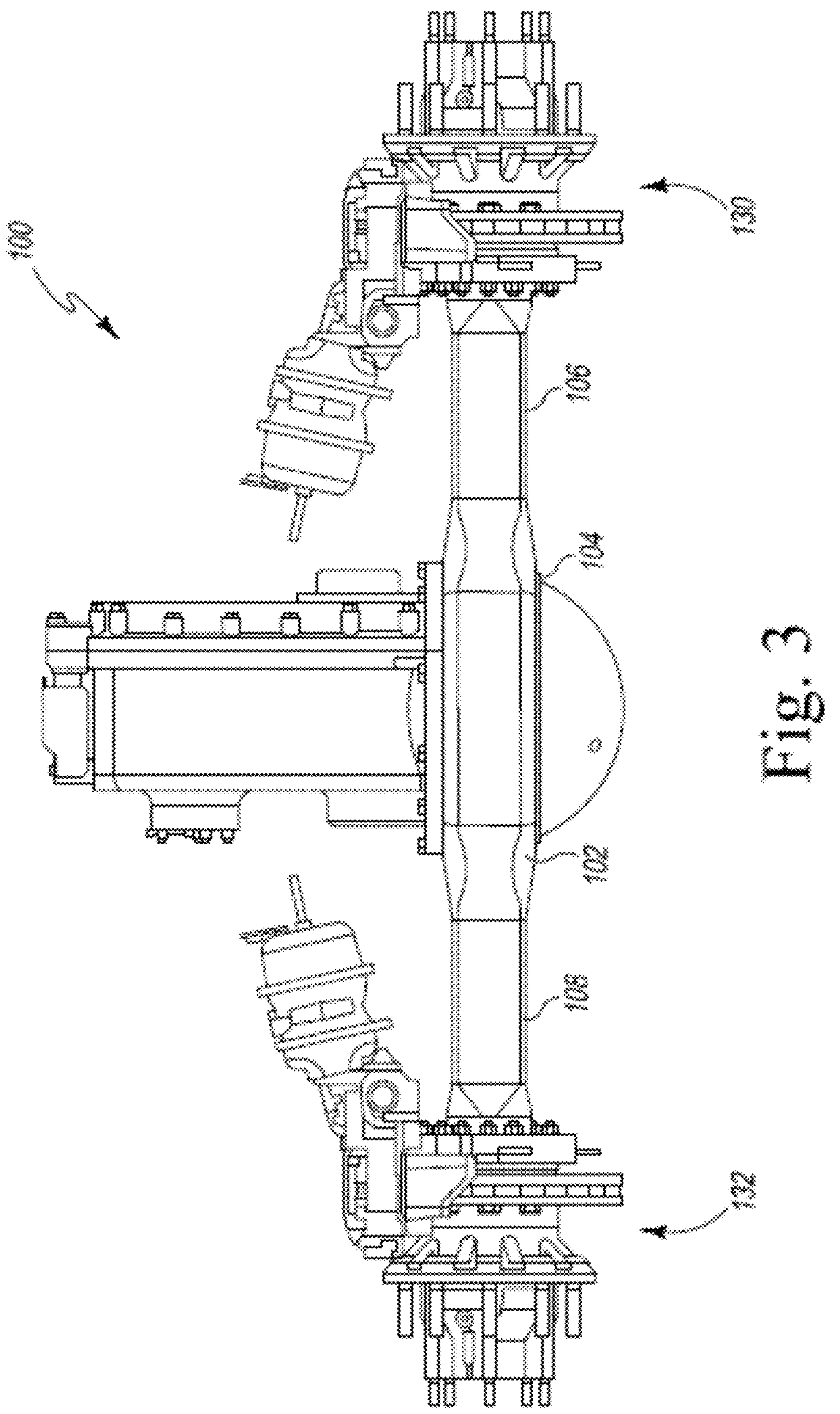
FIG. 3 is a top plan view of the electrified axle assembly of FIG. 1.
Figure 4:
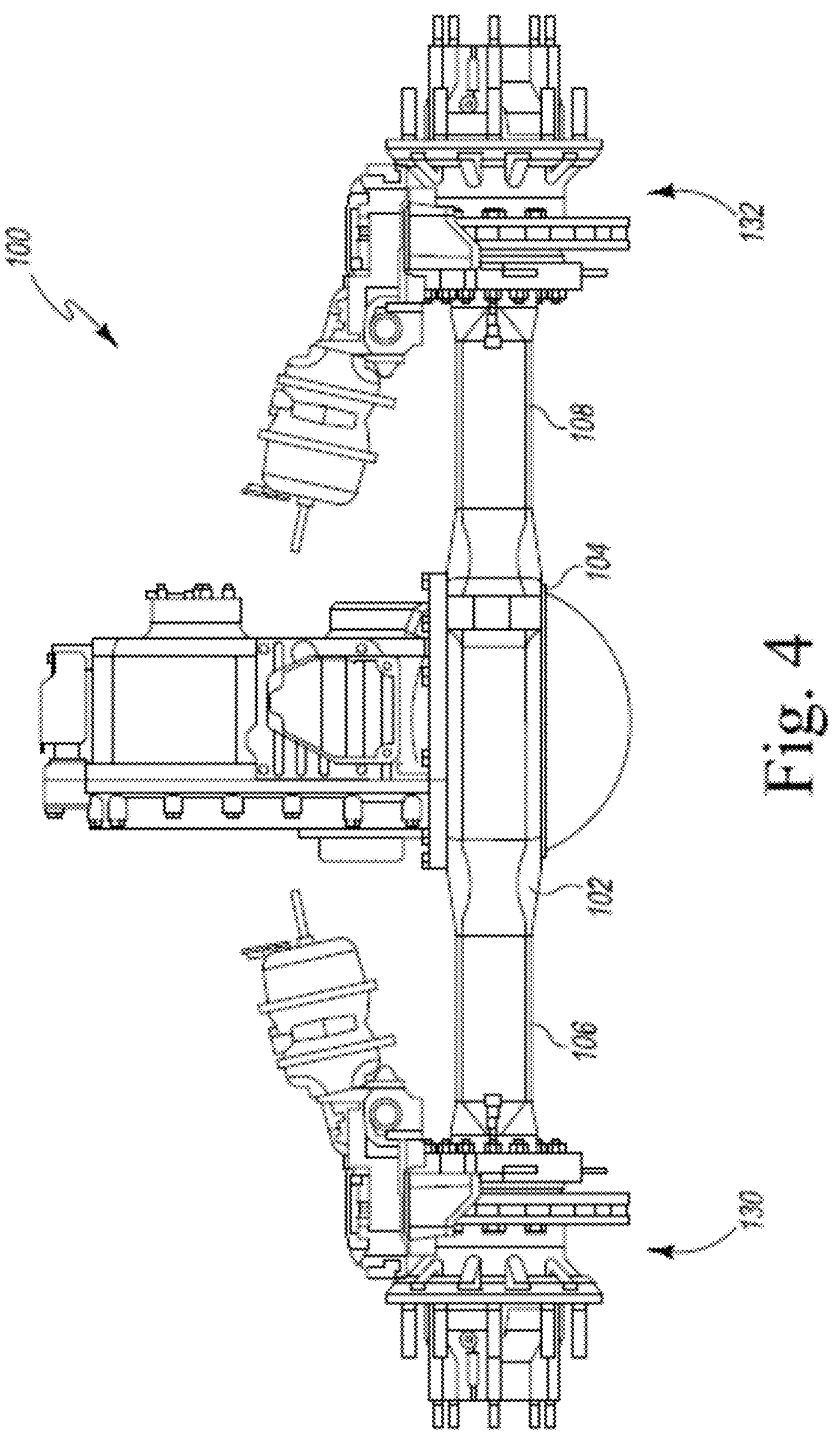
FIG. 4 is a bottom plan view of the electrified axle assembly of FIG. 1.
Figure 5:
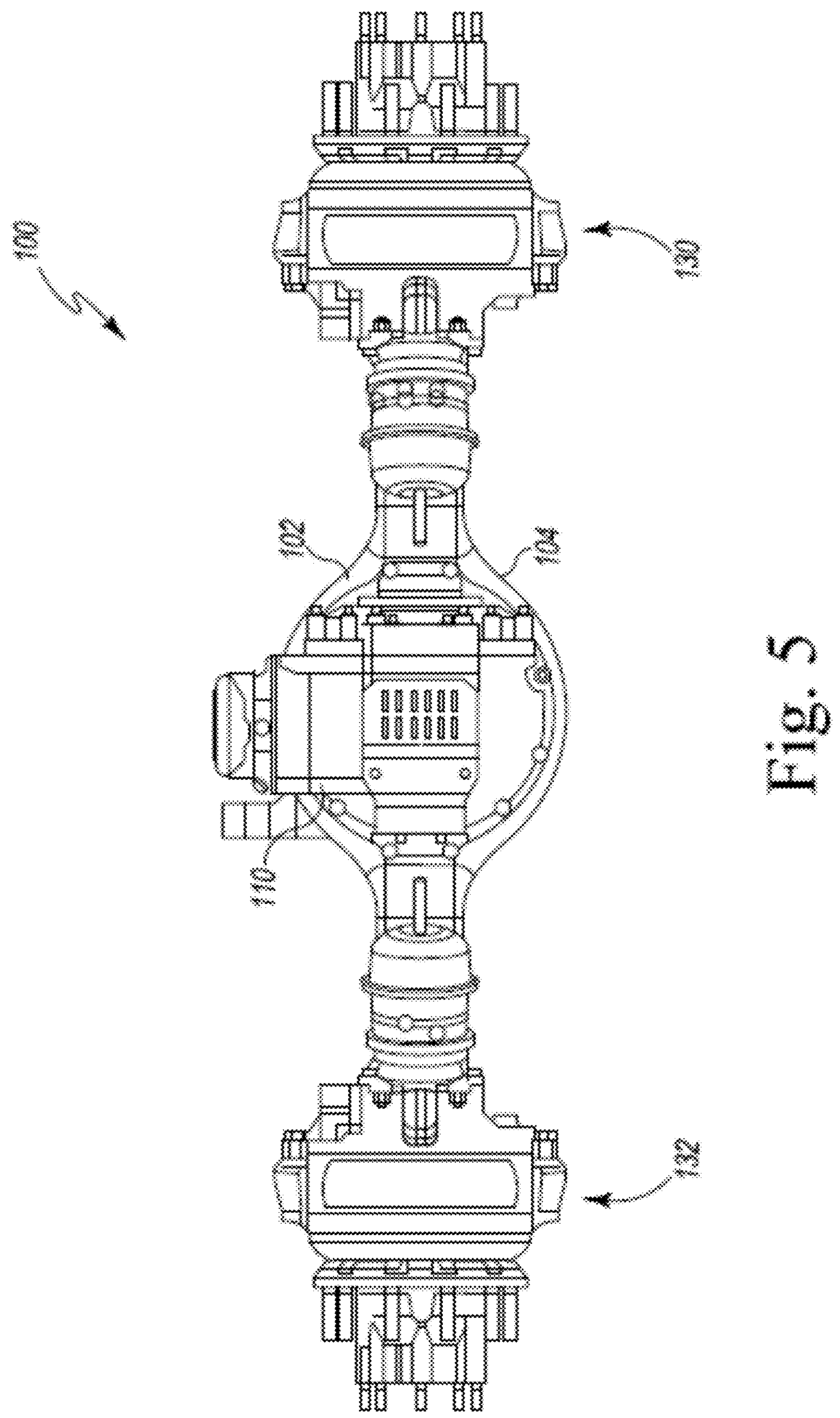
FIG. 5 is a front elevation view of the electrified axle assembly of FIG. 1.
Figure 6:
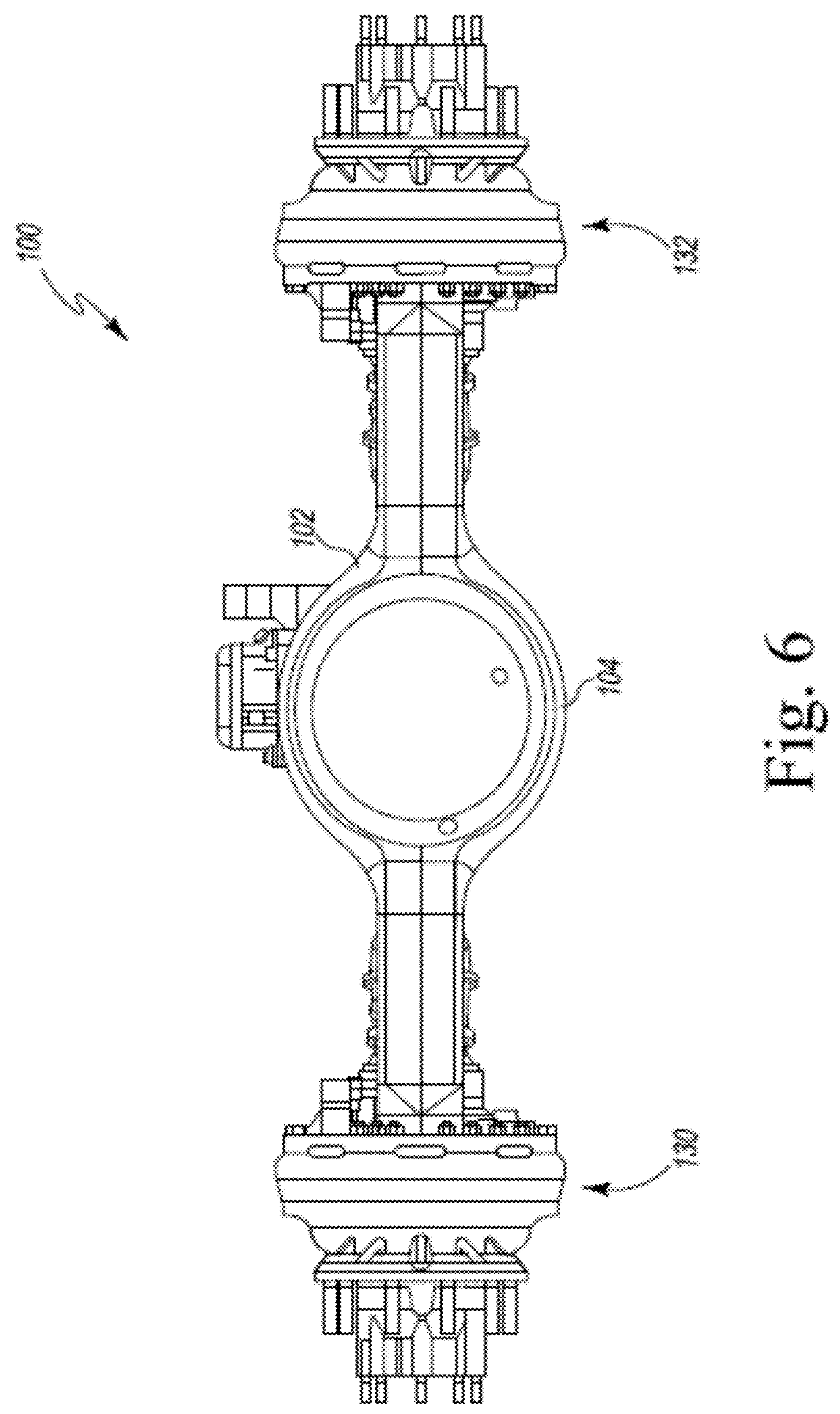
FIG. 6 is a back elevation view of the electrified axle assembly of FIG. 1.
Figures 7, 8:
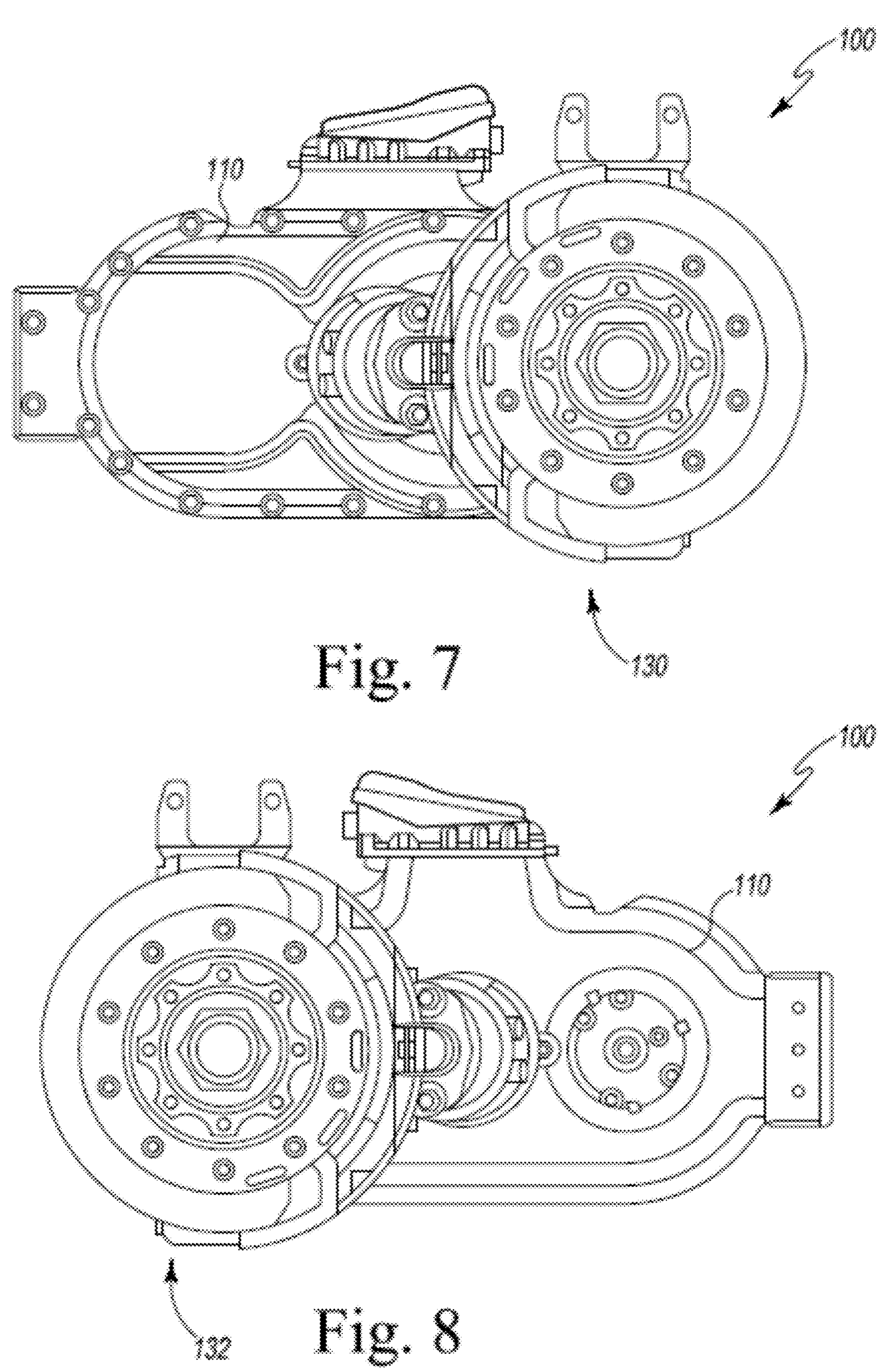
FIG. 7 is a side elevation view of the electrified axle assembly of FIG. 1.
FIG. 8 is another side elevation view of the electrified axle assembly of FIG. 1.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural and/or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an electrified axle assembly 100 includes an axle assembly housing 102 having a differential housing 104 and a pair of axle housings 106, 108. A powertrain box 110 is coupled to a front side 112 of the axle assembly housing 102. As discussed in more detail below with regard to FIGS. 15-21, the powertrain box 110 houses an electric motor 1502 and a gear set 1504, which is mechanically coupled to axles 1586, 1588 located within the axle housings 106, 108 to provide rotational power thereto.

The axle assembly housing 102 is illustratively of unitary construction. That is, the differential housing 104 and the axle housings 106, 108 are integrally formed with each other. However, in other embodiments, the differential housing 104 and the axle housings 106, 108 may be separate from each other but coupled together via suitable fasteners. The axle housing 106 includes a housing end 120, and the axle housing 108 includes a housing end 122. Each of the housing ends 120, 122 is coupled to a corresponding wheel end 130, 132. Illustratively, each of the wheel ends 130, 132 includes a wheel hub 134, 136 and a disk brake assembly 138, 140, respectively. In use, a vehicle wheel or tire (not shown) may be coupled to a corresponding wheel hub 134, 136 to facilitate movement of the associated vehicle. That is, in use, mechanical power generated by the electric motor 1502 is provided to wheel ends 130 132 via the gear set 1504 and the axles 1586, 1588 to enable rotational motion of the associated wheel(s) in a forward direction causing the vehicle to move forwards or in a backward direction causing the vehicle to move backwards as discussed in more detail below.

Figure 9:
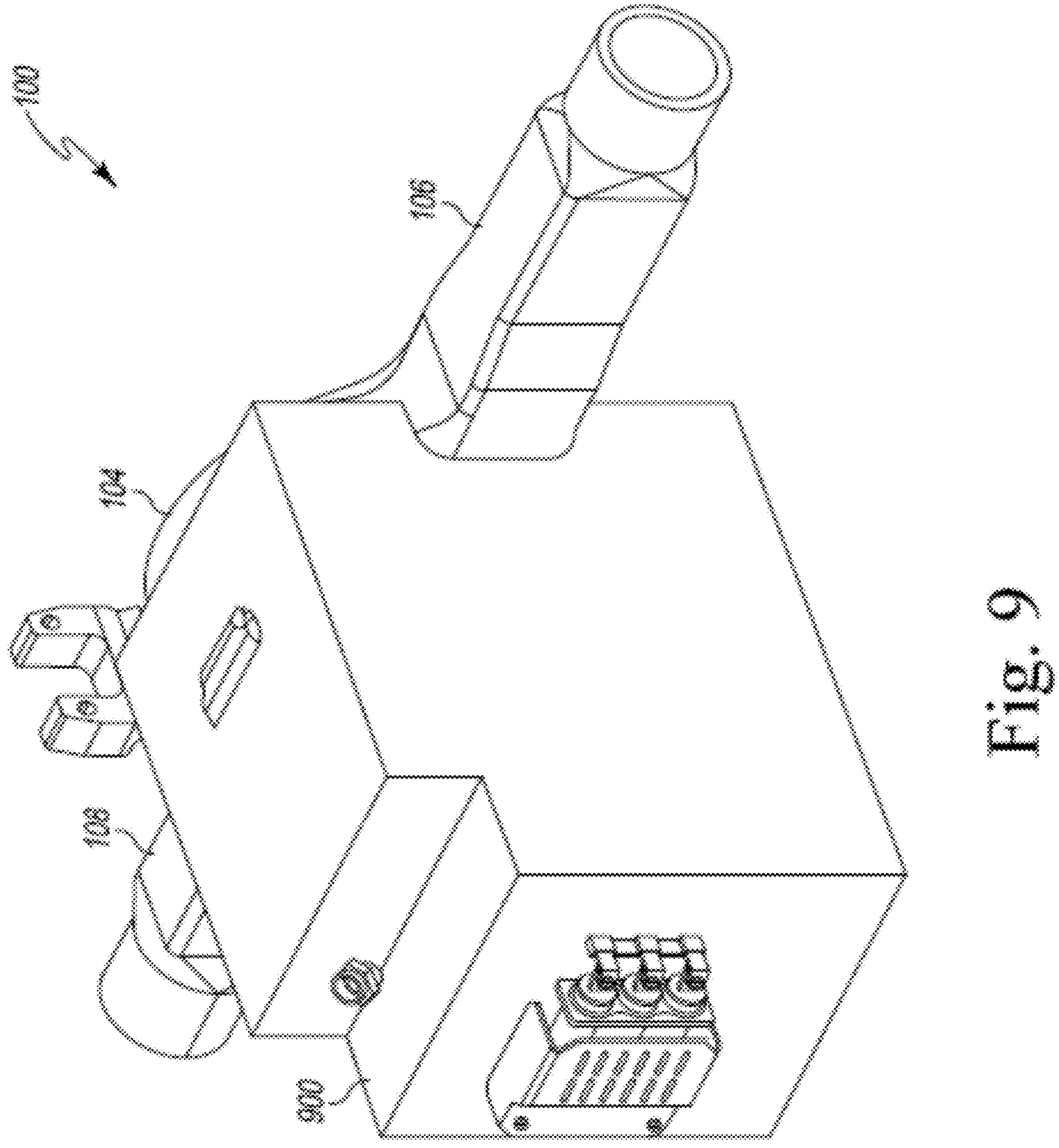
FIG. 9 is an illustration of an environment enclosure boundary of the electrified axle assembly of FIG. 1.
Figure 10:
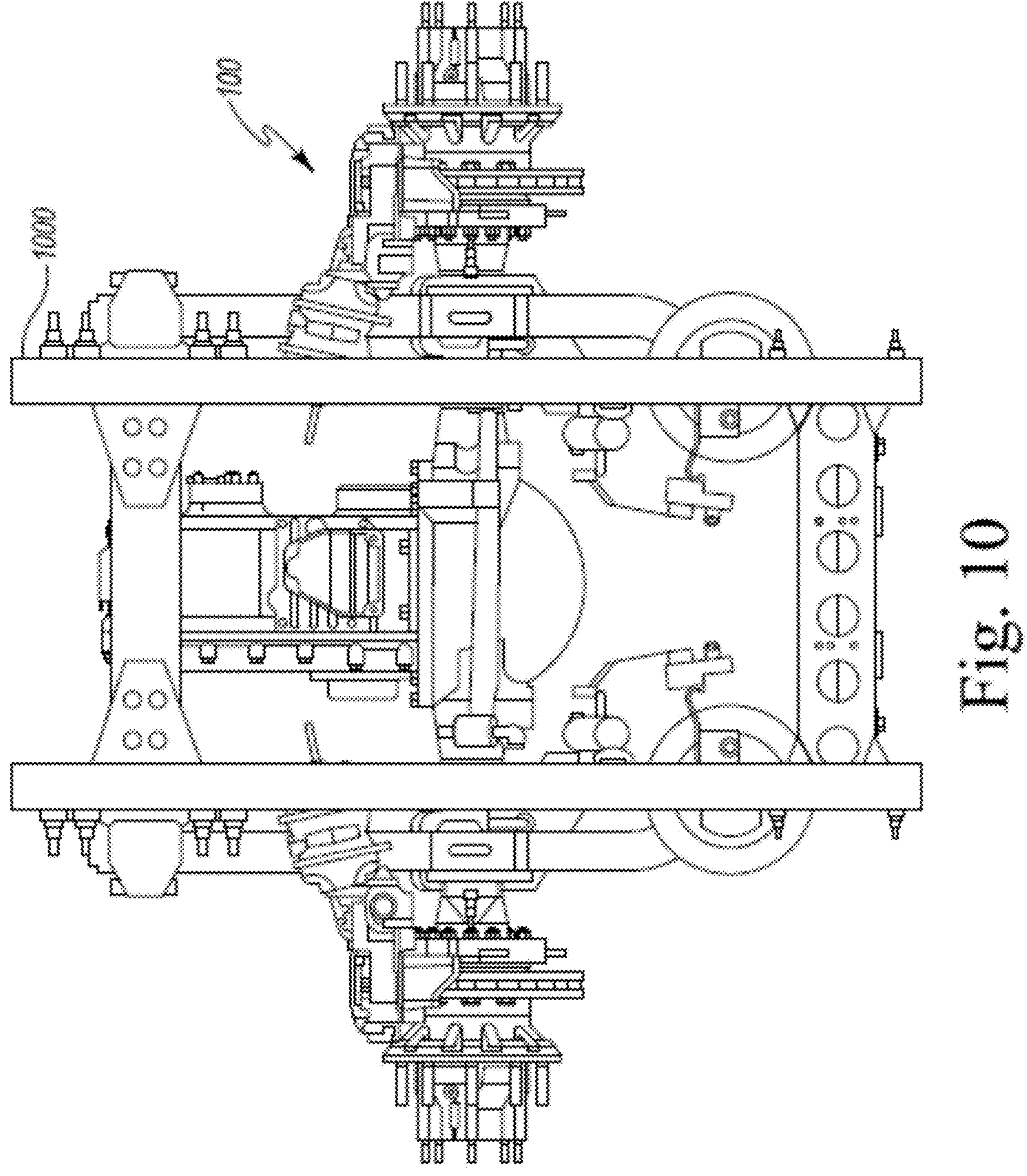
FIG. 10 is a top plan view of the electrified axle assembly of FIG. 1 mounted onto a vehicle frame assembly.
Figure 11:
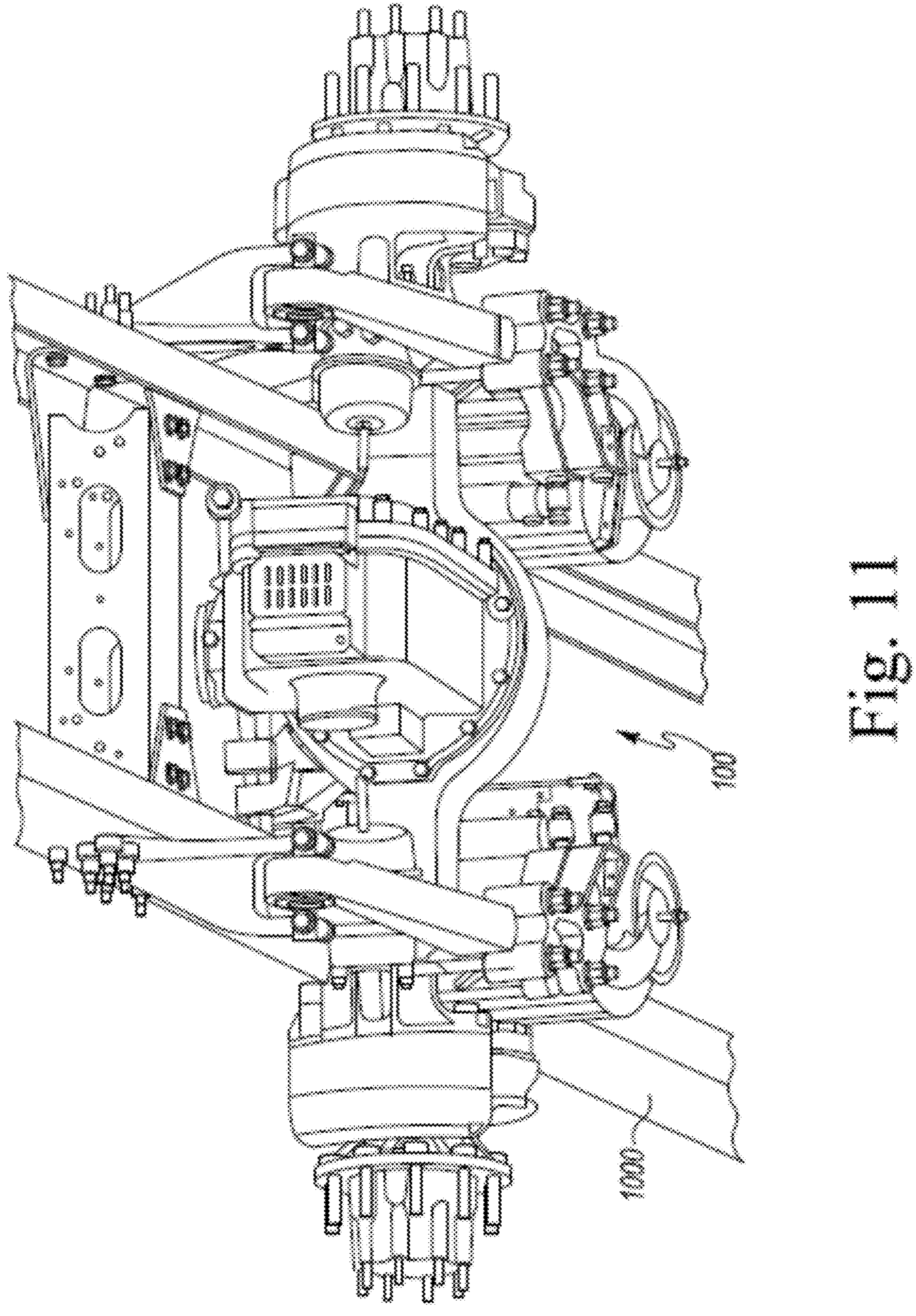
FIG. 11 is a bottom perspective view of the of the vehicle frame assembly of FIG. 10.
Figure 12:
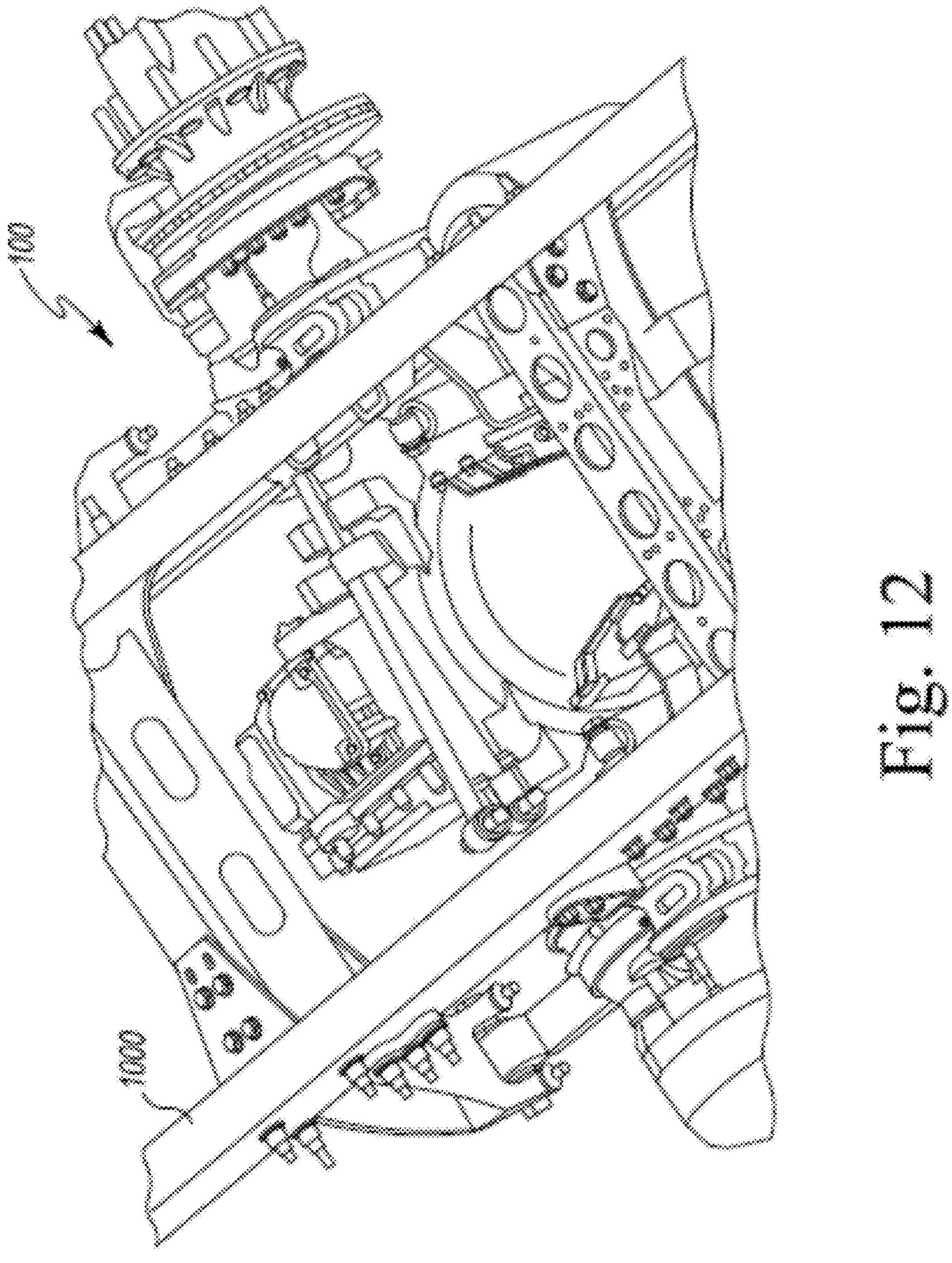
FIG. 12 is a top perspective view of the vehicle frame assembly of FIG. 10.
Figure 13:
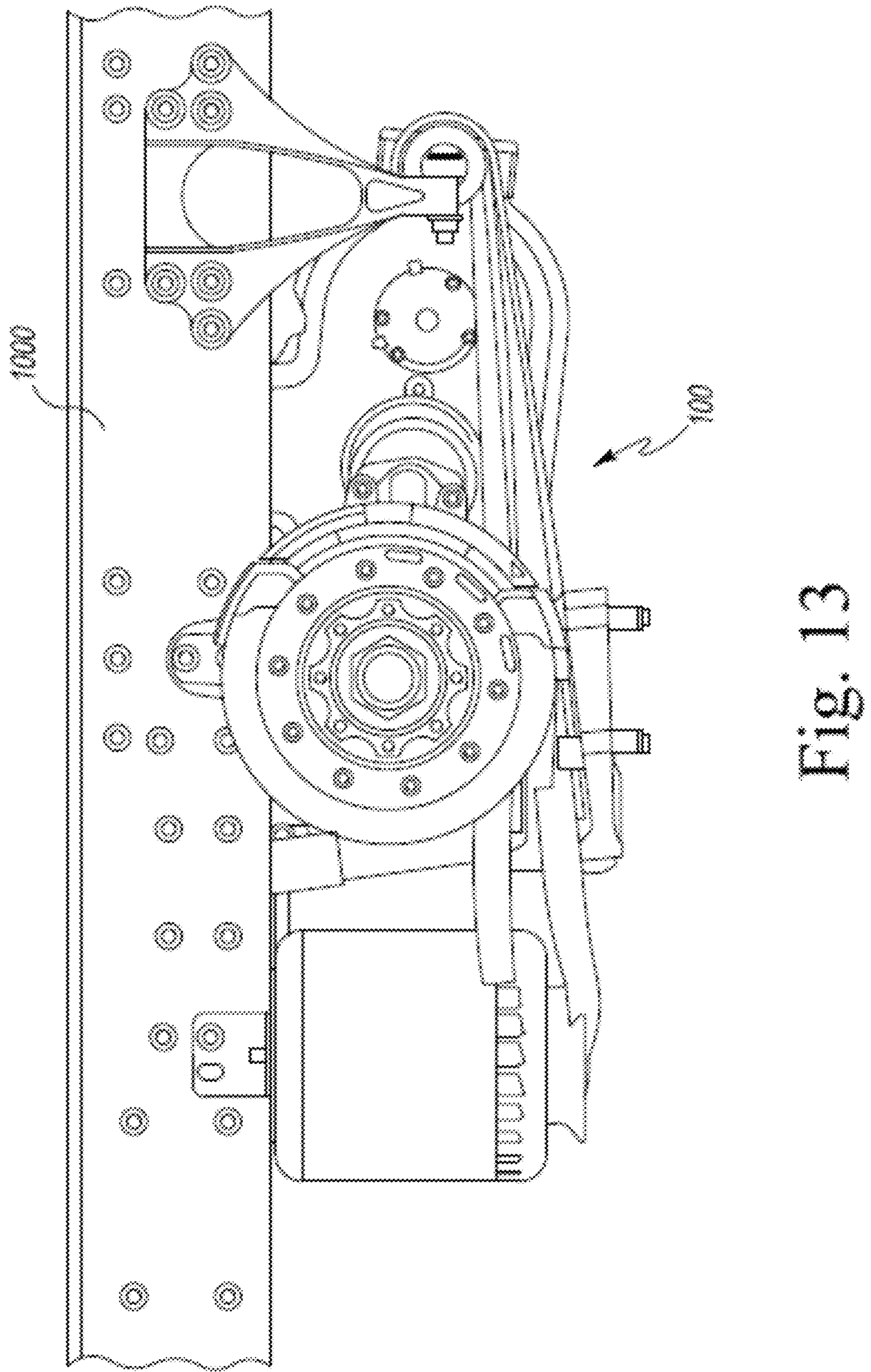
FIG. 13 is a side elevation view of the vehicle frame assembly of FIG. 10.
Figure 14:
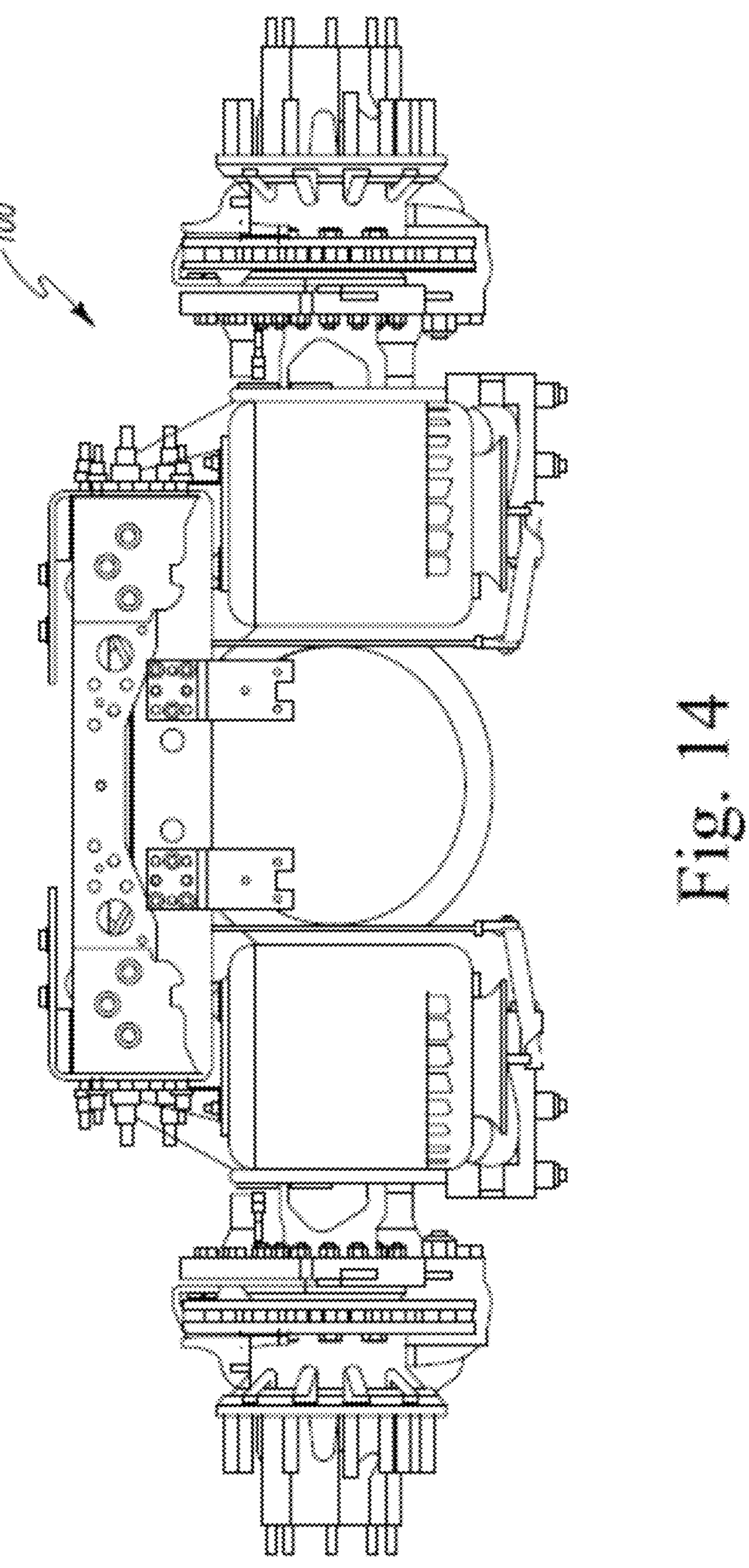
FIG. 14 is a back elevation view of the vehicle frame assembly of FIG. 10.
Figure 15:
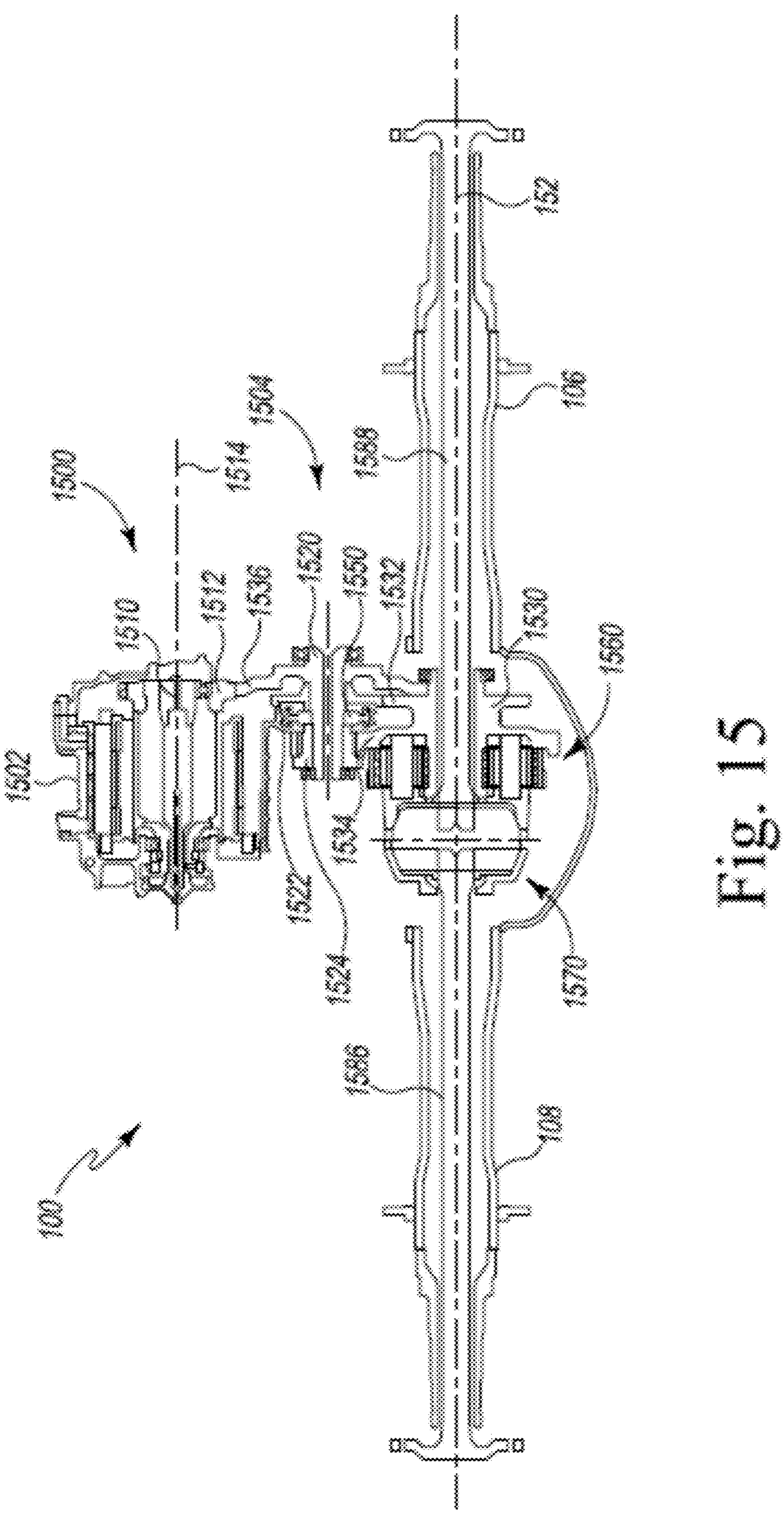
FIGS. 15 and 16 are a schematic drawing of the electrified axle assembly of FIG. 1.

As shown best in FIGS. 1-8, the powertrain box 110 is coupled to the axle assembly housing 102 along a housing axis 150 that is planar with, but orthogonal to, an axle axis 152 defined by the axle housings 106, 108. As such, the powertrain box 110 occupies an equipment space typically occupied by components of the drive train of a typical non-electrified axle vehicle. For example, in some applications, the powertrain box 110 may be restricted to residing within an environment enclosure boundary 900 as diagrammatically shown in FIG. 9. That is, the boundary 900 identifies the physical space within which the powertrain box 110, or the majority thereof, should reside when coupled to the axle assembly 100 to avoid spatial interference with other components. In some embodiments, the environment enclosure boundary 900 may correspond to the available space of existing vehicles in which the electrified axle assembly 100 is to be installed (e.g., in retrofitted applications).

Referring now to FIGS. 10-14, the electrified axle assembly 100 is shown attached to a frame 1000 of a vehicle. As shown, the electrified axle assembly 100 occupies the space typically occupied by the "rear end" assembly of the vehicle (e.g., a truck or construction equipment). Because the powertrain box 110 (and, therefore, the electric motor 1502) is coplanar with the axle housings 106, 108, the ground clearance of the electrified axle assembly 100 may be improved relative to other electric axle designs. For example, in some embodiments, the placement and structure (e.g., the inclusion of the planetary gear set 1560 in the gear set 1504) allows for a clearance between the bottom of a wheel of the vehicle and the bottom of the axle assembly housing 102 of about thirteen inches or more. Additionally, it should be appreciated that because the powertrain box 110 is coupled directly to the axle assembly housing 102 and includes the motor 1502, the complete powertrain, including electronics, moves with the axle assembly housing 102.

Referring now to FIGS. 15-21, as discussed above, the powertrain box 110 houses the powertrain 1500 of the electrified axle assembly 100. The powertrain 1500 illustrative includes the electric motor 1502 and the gear set 1504. The motor 1502 may be embodied as any type of electric motor, such as a Direct Current (DC) or Alternating Current (AC) motor, brushed or brushless, and/or other type of electric motor suitable for driving an axle assembly. The motor 1502 includes a rotor shaft 1510 extending therefrom and a pinion 1512 attached to the rotor shaft 1510. It should be appreciated that the rotor shaft 1510 extends along an axis 1514 that is a parallel to the axle axis 152.

The gear set 1504 includes an idler shaft 1520 and an output shaft 1530, each of which is orientated parallel with the axis 1514 and the axle axis 152 such that the electrified axle assembly 100 includes five parallel shafts. The idler shaft 1520 includes a pair of idler gears 1522 and 1524 and a shift mechanism 1550, which cooperate to provide two different speeds for the electrified axle assembly 100. Each idler gear 1522, 1524 is rotatably coupled to the idler shaft 1520 and configured to mesh with a corresponding output gear 1532, 1534 of the output shaft 1530 such that a rotation of a idler gear 1522, 1524 causes rotation of the corresponding meshed output gear 1532, 1534. The idler shaft 1520 also includes a drive wheel 1536 attached at one end and meshed with the pinion 1512 of the motor 1502. As such, the drive wheel 1536 is configured to transfer torque from the drive pinion 1512 to the idler shaft 1520.

As discussed above, the pair of idler gears 1522, 1524 define different reduction ratios of the powertrain 1500. For example, the idler gear 1522 may correspond to a first reduction ratio, and the idler gear 1524 may correspond to a second reduction ratio. Each of the idler gears 1522, 1524 is configured to spin freely on the idler shaft 1520 such that when the corresponding reduction ratio is not engaged, no torque is transferred between the idler shaft 1520 and the corresponding idler gear 1522, 1524. The reduction ratio (i.e., the idler gear 1522, 1524) is selected via the operation of the shift mechanism 1550.

Figure 21:
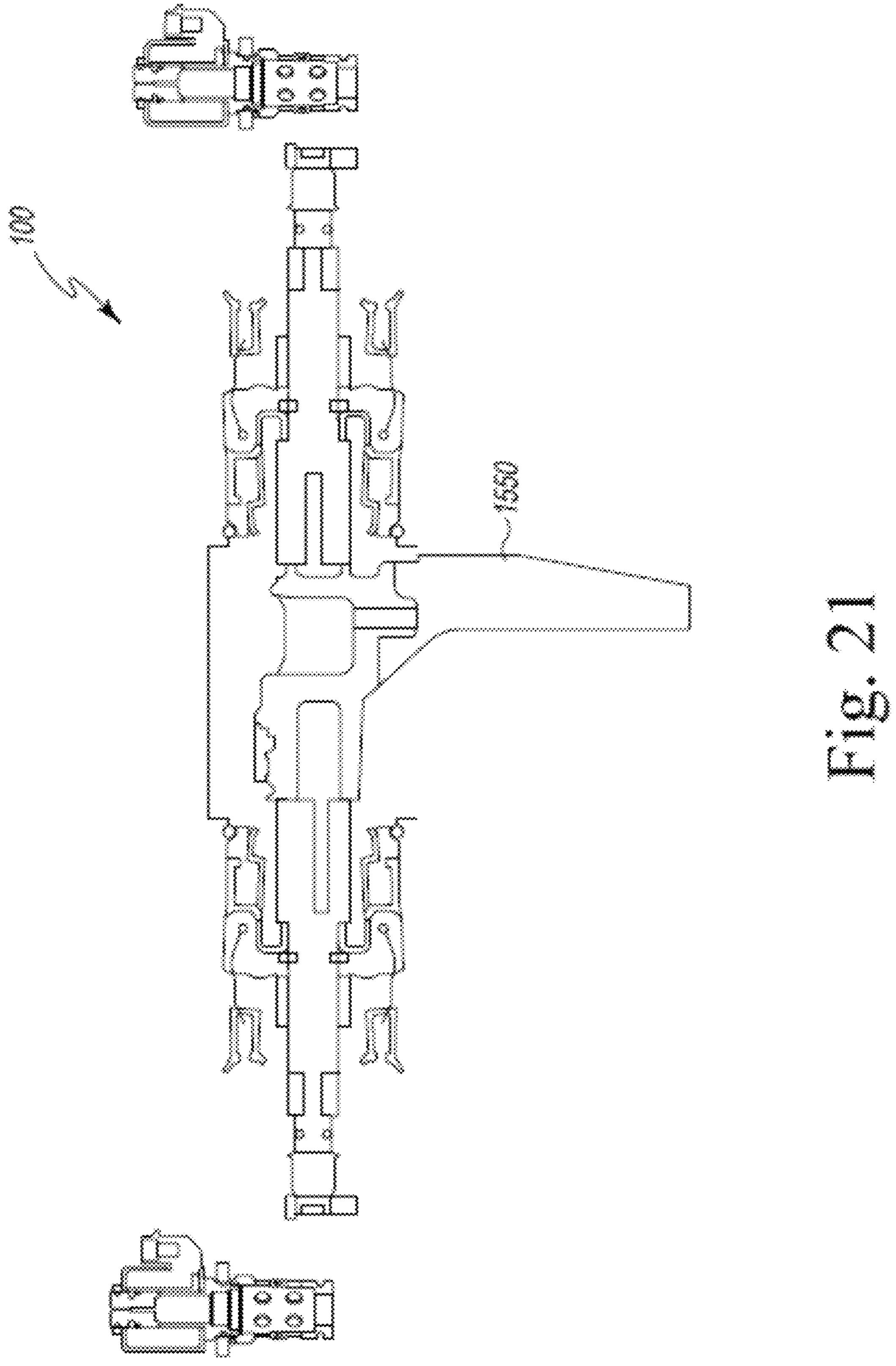
FIG. 21 is an illustration of an embodiment of a shift mechanism that may be used with the electrified axle assembly of FIG. 1.

In the illustrative embodiment, the shift mechanism 1550 is embodied as a synchronizer. Additionally, as shown in FIG. 21, the shift mechanism 1550 may include a shift ring, shift fork, and an actuator. The shift ring may be slideable along the idler shaft 1520 between the idler gears 1522, 1524. The shift ring may be rotatably coupled to the idler shaft 1520 such that the shift ring and the idler shaft 1520 rotate at the same speed. The shift ring may include at least one splined portion that is engageable with a corresponding splined portion of either of the idler gears 1522, 1524. Additionally, the shift ring may define a groove configured to engage the shift fork. The shift fork may be coupled to the actuator and movable to select the first reduction ratio or the second reduction ratio. The shift fork may be engaged with the shift ring such that the shift fork is capable of moving the shift ring into engagement with one of the idler gears 1522, 1524. Additionally, the shift fork may be movable into a neutral position in which neither of the idler gears 1522, 1524 are engaged with the shift ring. The actuator may be controlled manually or automatically. For example, the actuator may be responsive to hydraulic pressure, pneumatic pressure, or electronic signals generated by a transmission control module. Alternatively, the actuator may include a mechanical linkage controlled by the vehicle operator.

The output shaft 1530 includes the pair of output gears 1532, 1534. The output gear 1532 is meshed with the idler gear 1522, and the output gear 1534 is meshed with the idler gear 1524. The output gears 1532, 1534 are rotatably fixed to the output shaft 1530 such that the output gears 1532, 1534 and the output shaft 1530 rotate at the same speed. The output shaft 1530 further includes a sun gear 1562 of a planetary gear set 1560 attached to an end opposite the output gears 1532, 1534. The planetary gear set 1560 also includes a plurality of planet gears 1564, a planet carrier 1566, and a ring gear 1568. The plurality of planet gears 1564 are rotatably coupled to the planet carrier 1566. The planet carrier 1566 is arranged adjacent to the ring gear 1568 with each planet gear 1564 disposed in the ring gear 1568. In this way, each planet gear 1564 engages both the ring gear 1568 and the sun gear 1562. In other embodiments, the planetary gear set 1560 may have a different configuration and couple to the output gear 1532 in an alternative arrangement.

In the illustrative embodiment, when the output shaft 1530 rotates the sun gear 1562, the sun gear 1562 rotates each planet gear 1564, which in turn rotates the planet carrier 1566. The planet carrier 1566 forms the differential case 1572 of a differential 1570. The differential 1570 is coupled to the axles 1586, 1588 and allows each of the wheel ends 130, 132 to rotate at different speeds, which facilitates better handling of the associated vehicle. The differential 1570 includes a pair of differential pinions 1574 rotatably coupled to the differential case 1572, which are meshed with splined ends 1576, 1578 of the axles 1586, 1588. In this way, mechanical power provided by the electric motor 1502 is transferred through the idler shaft 1520, the output shaft 1530, the planetary gear set 1560, and the differential 1570 to the axles 1586, 1588, which provide rotational movement of the corresponding wheels.

Figure 16:
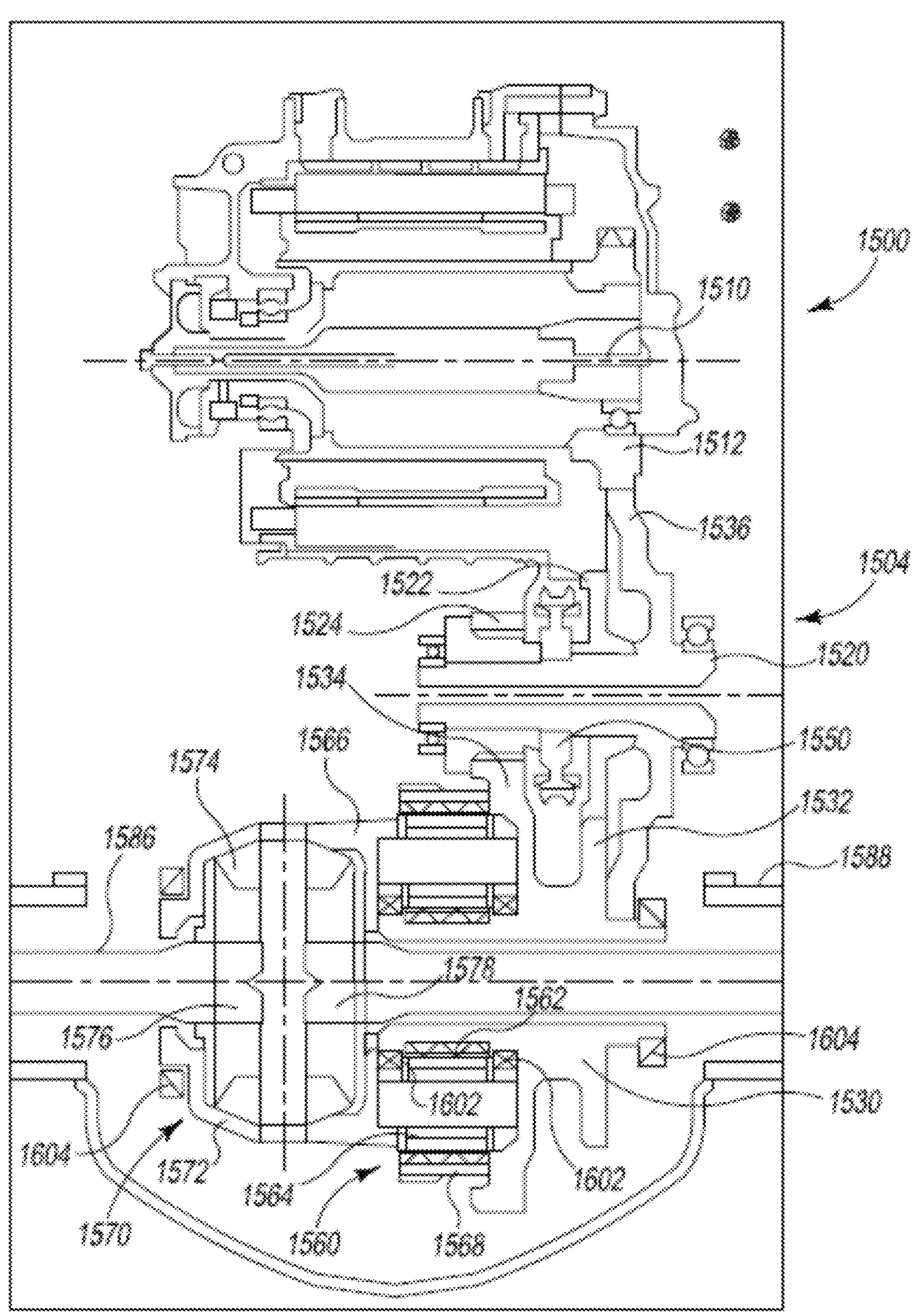
Figure 17:
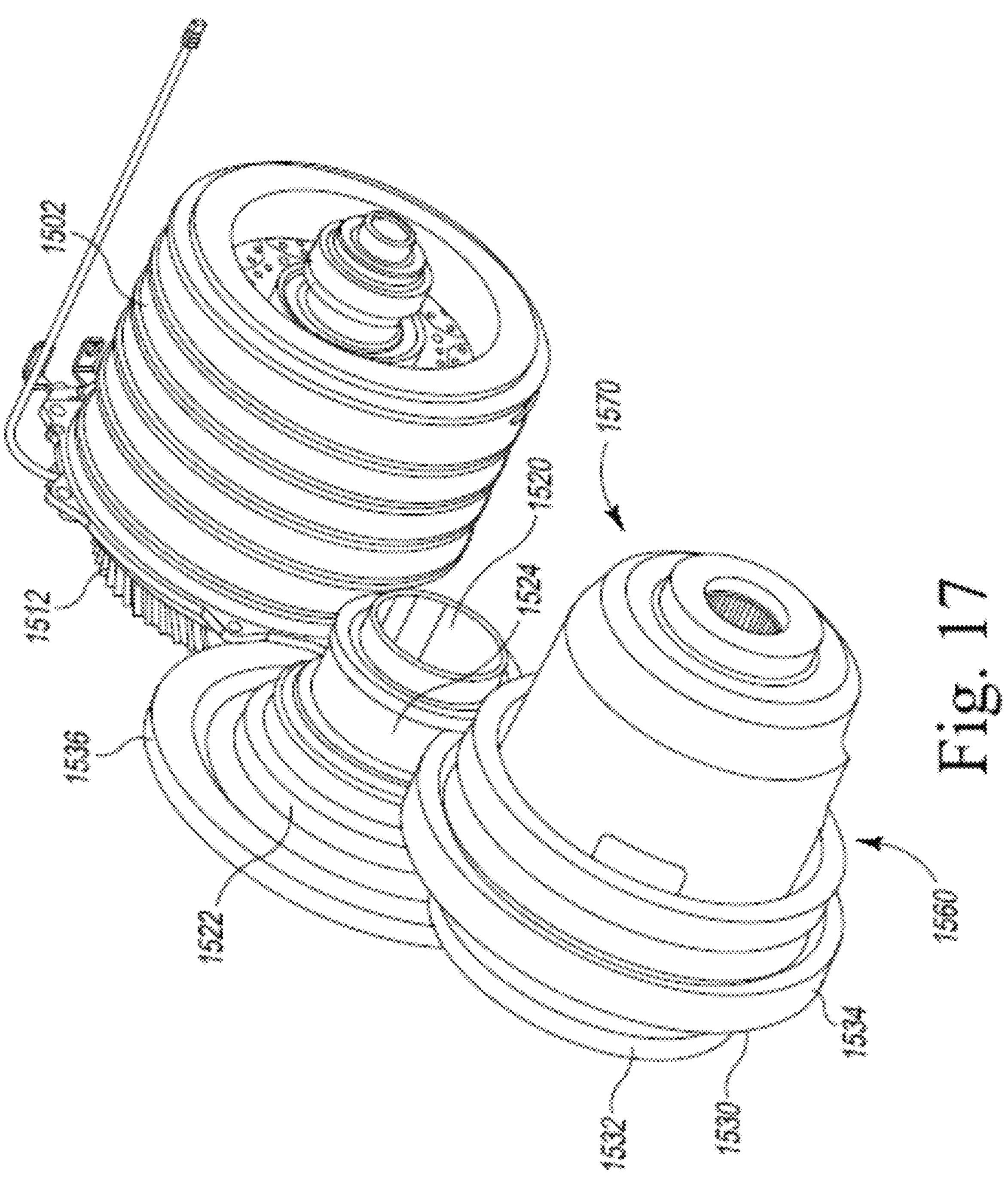
FIG. 17 is a perspective view of a gear set of the electrified axle assembly of FIG. 1.
Figure 18:
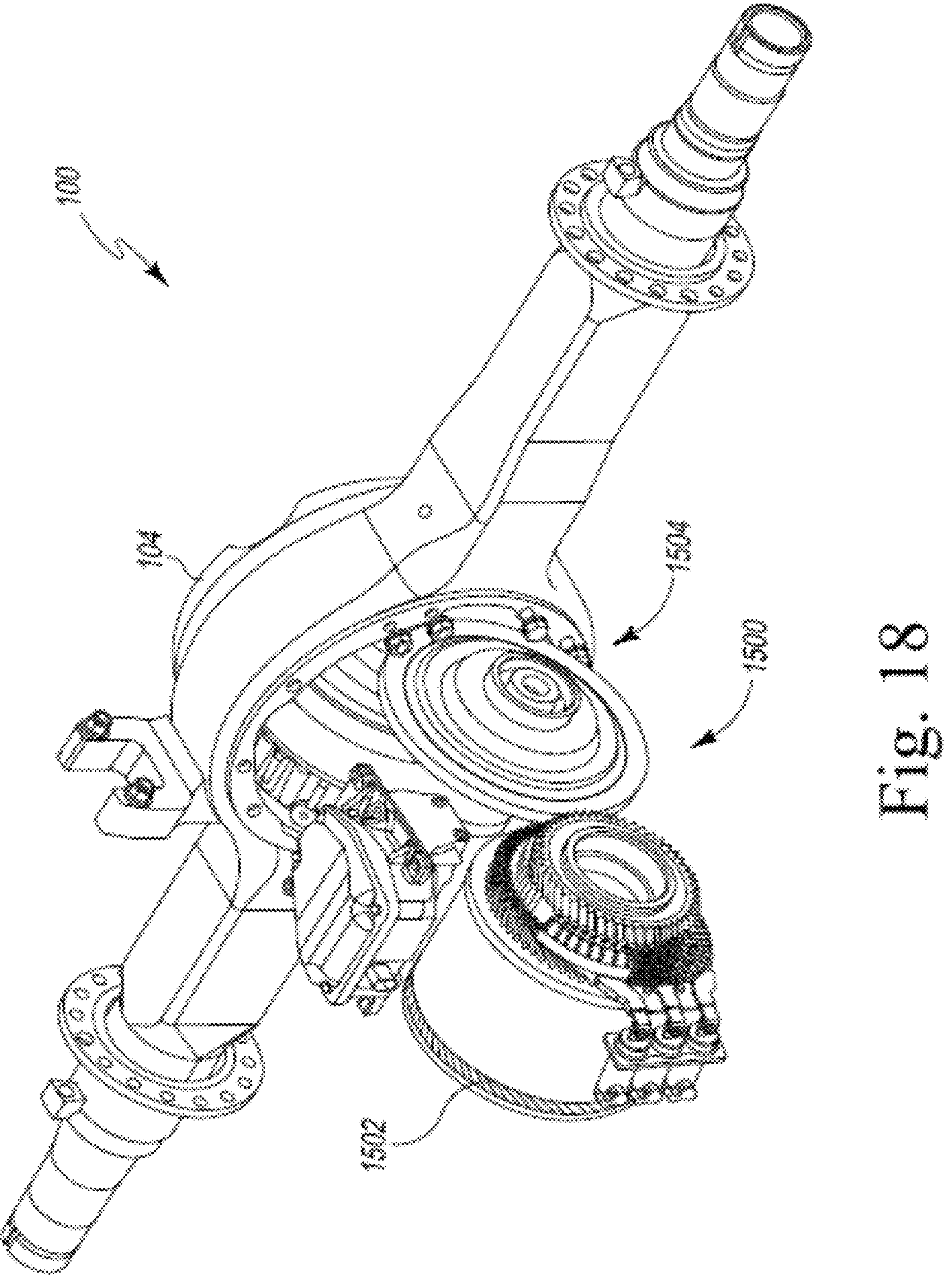
FIG. 18 is a perspective view of the of the electrified axle assembly of FIG. 1 having the front cover removed to show the gear set of FIG. 17 installed into an axle assembly housing.
Figure 19:
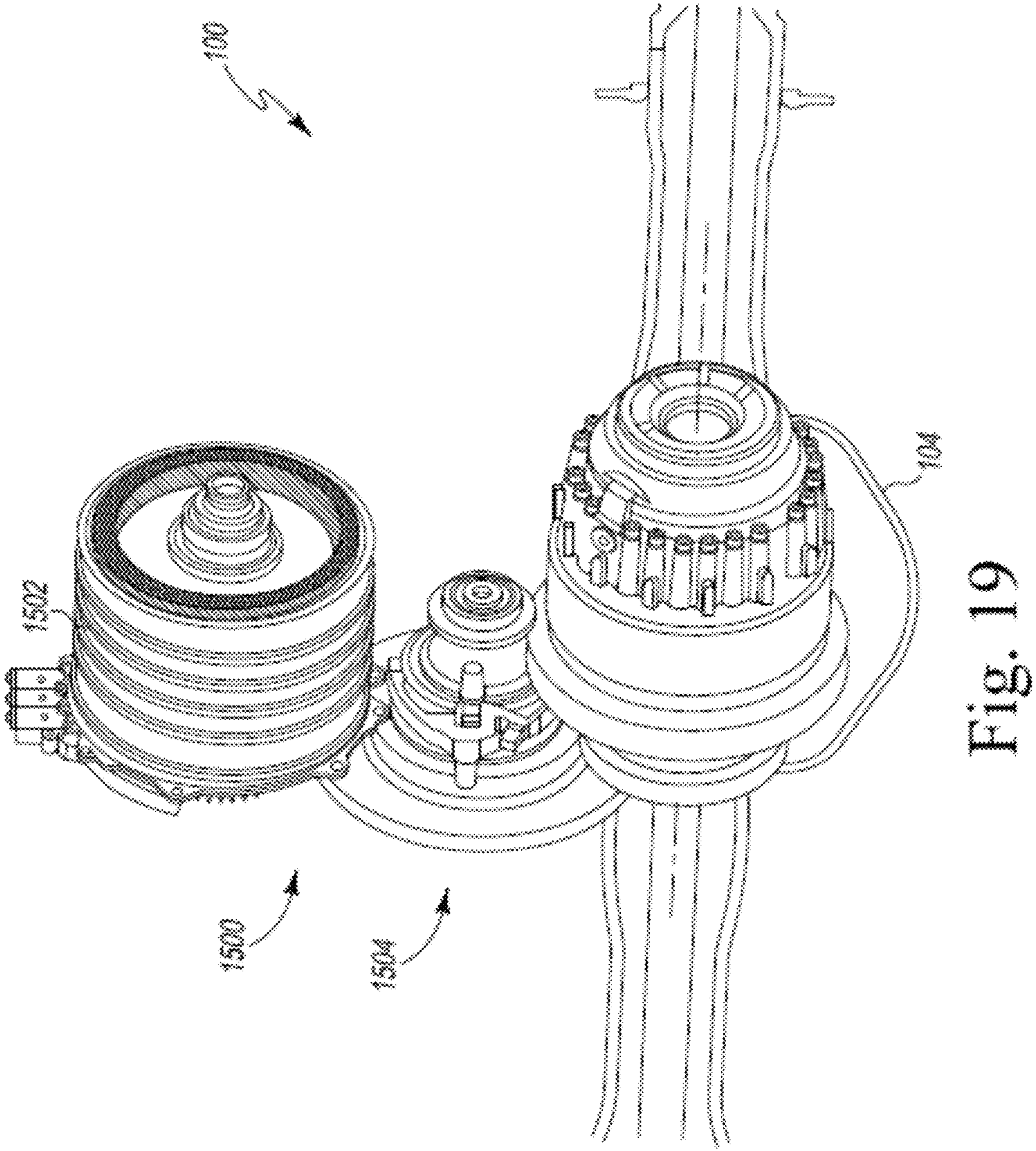
FIG. 19 is a top perspective view of the gear set of FIG. 17.
Figure 20:
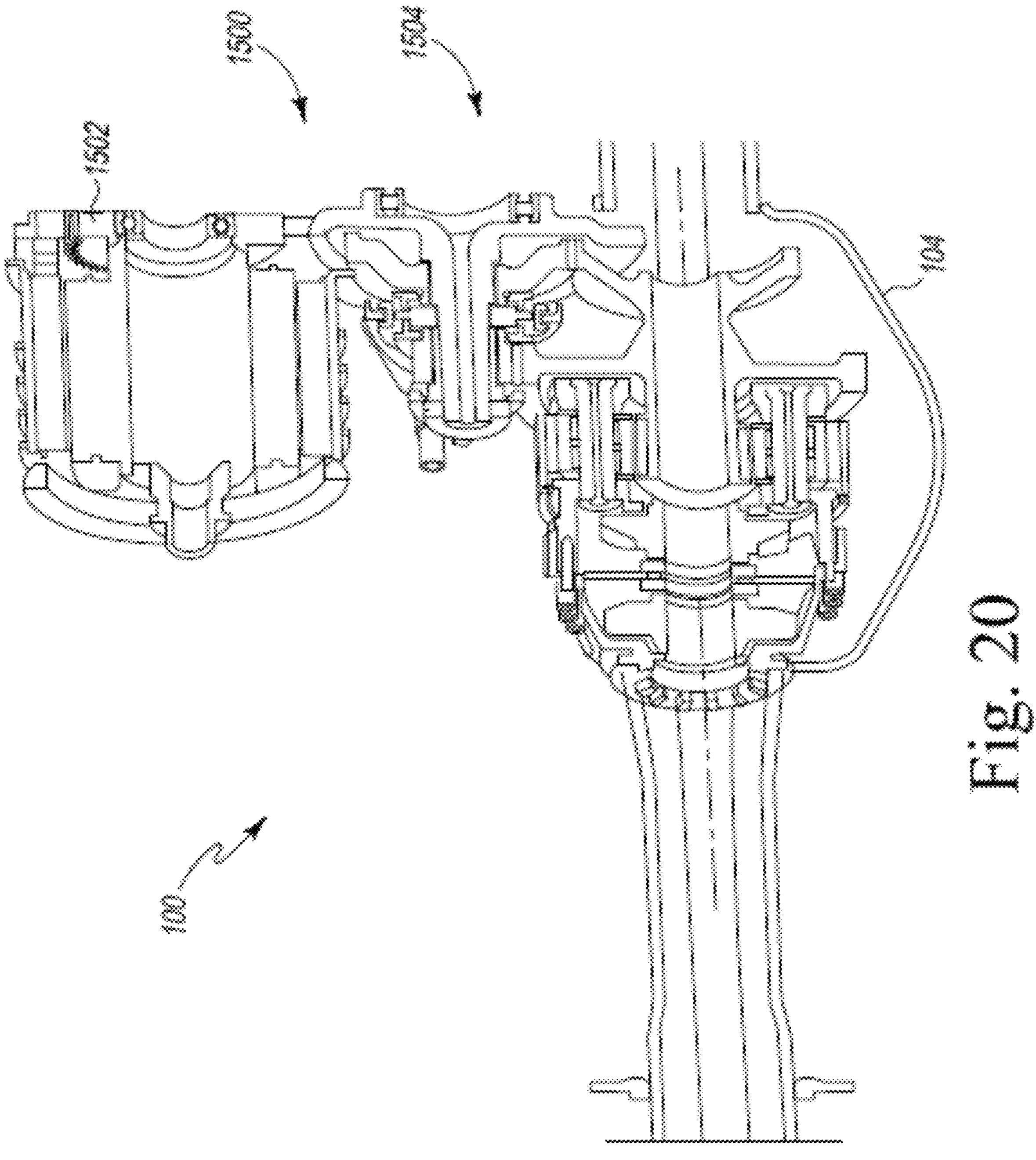
FIG. 20 is a cross-sectional view of the gear train of FIG. 17.

As best shown in FIG. 16, the gear set 1504 also includes a set of inner bearings 1602 and outer bearings 1604. The inner bearings 1602 are embodied as roller bearings positioned between the output shaft 1530 and the planet carrier 1566 (i.e., on either lateral end of the planet carrier 1566). As such, the inner bearings 1602 facilitate relative movement of the output shaft 1530 and the planet carrier 1566. In this way, the inner bearings 1602 allow for the positioning of four separate shafts (i.e., the output shaft 1530, the planet carrier 1566, and the axles 1586, 1588) into a space typically used to facilitate three shafts, with the axle 1588 extending through the output shaft 1530 and into the planetary gear set 1560.

The output bearings are illustratively embodied as tapered roller bearings and located at one end of the planet carrier 1566 and an end of the output shaft 1530, opposite the planet carrier 1566.

Figure 22:
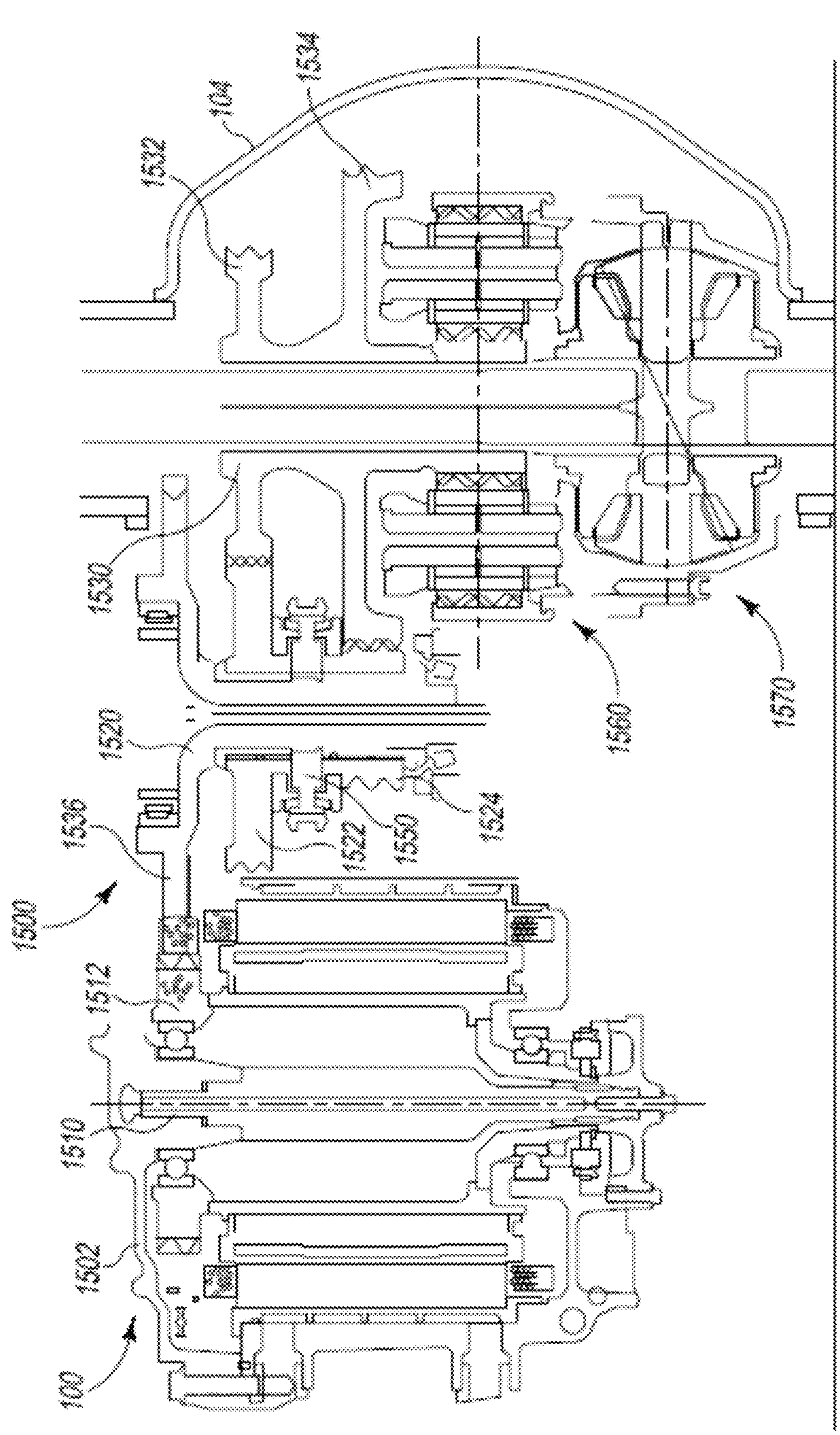
FIGS. 22 and 23 are a schematic drawing of another embodiment of an electrified axle assembly.
Figure 23:
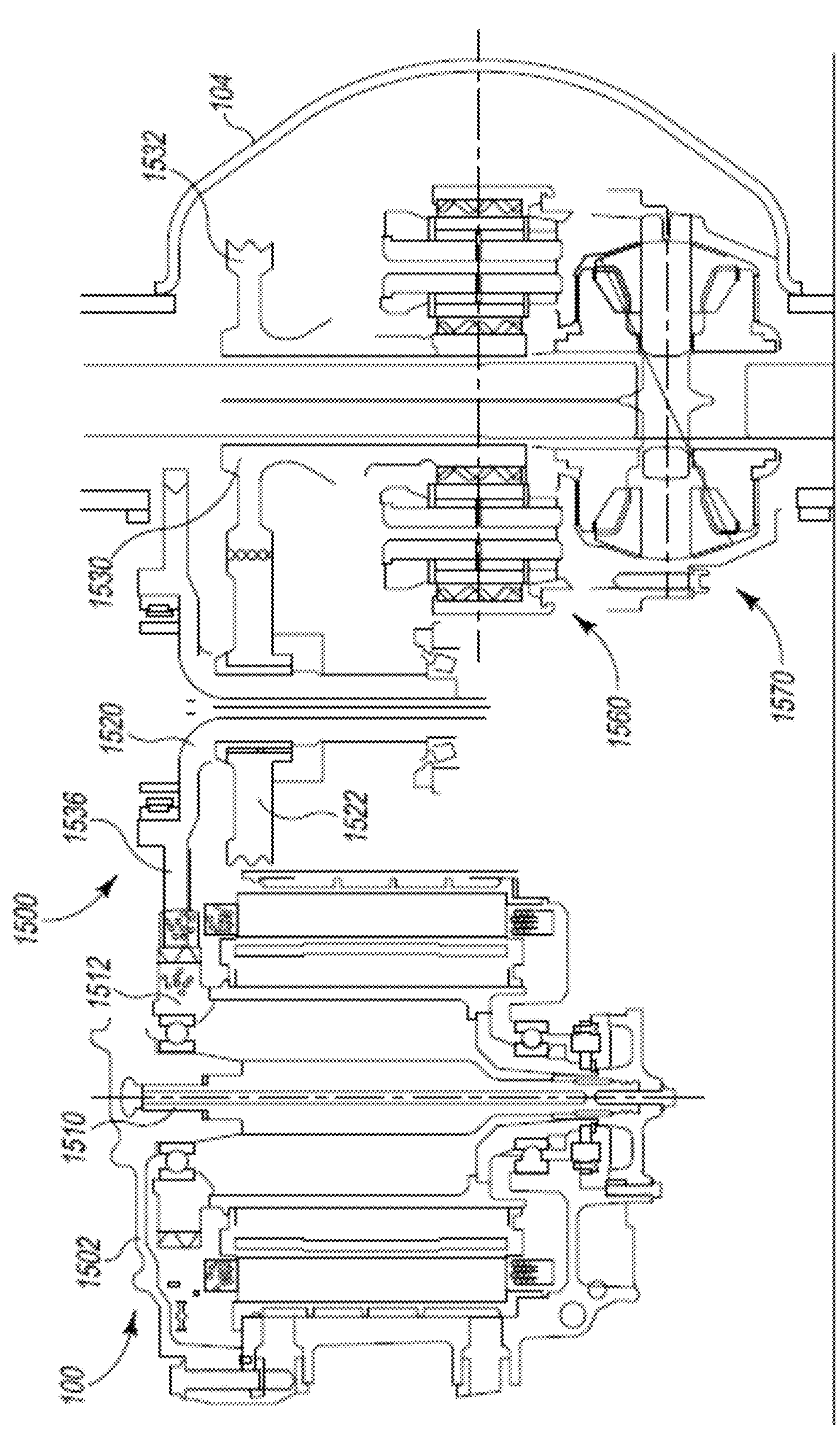
Figure 24:
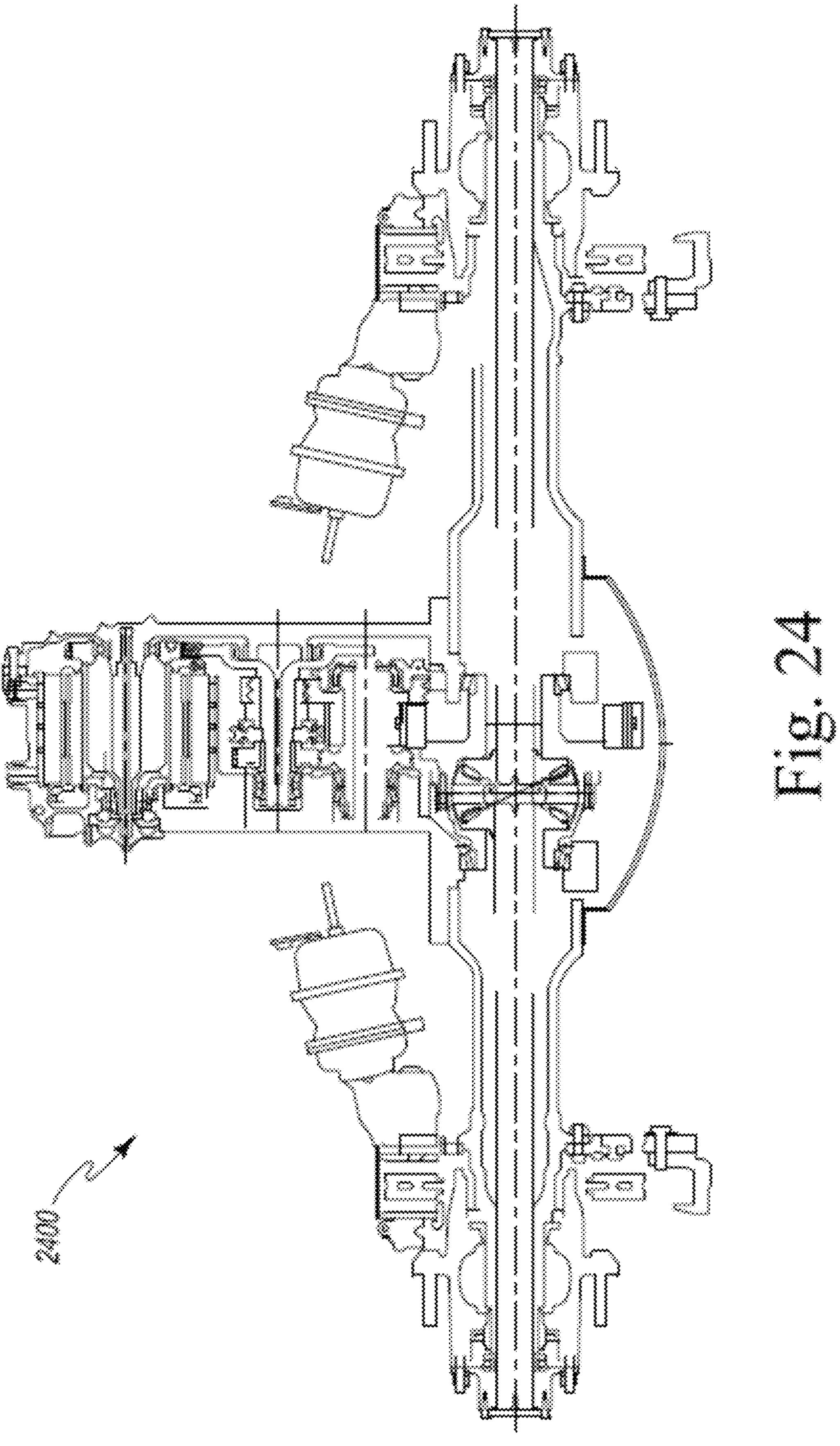
FIG. 24 is a schematic drawing of a two speed embodiment of the electrified axle assembly of FIG. 1.
Figure 25:
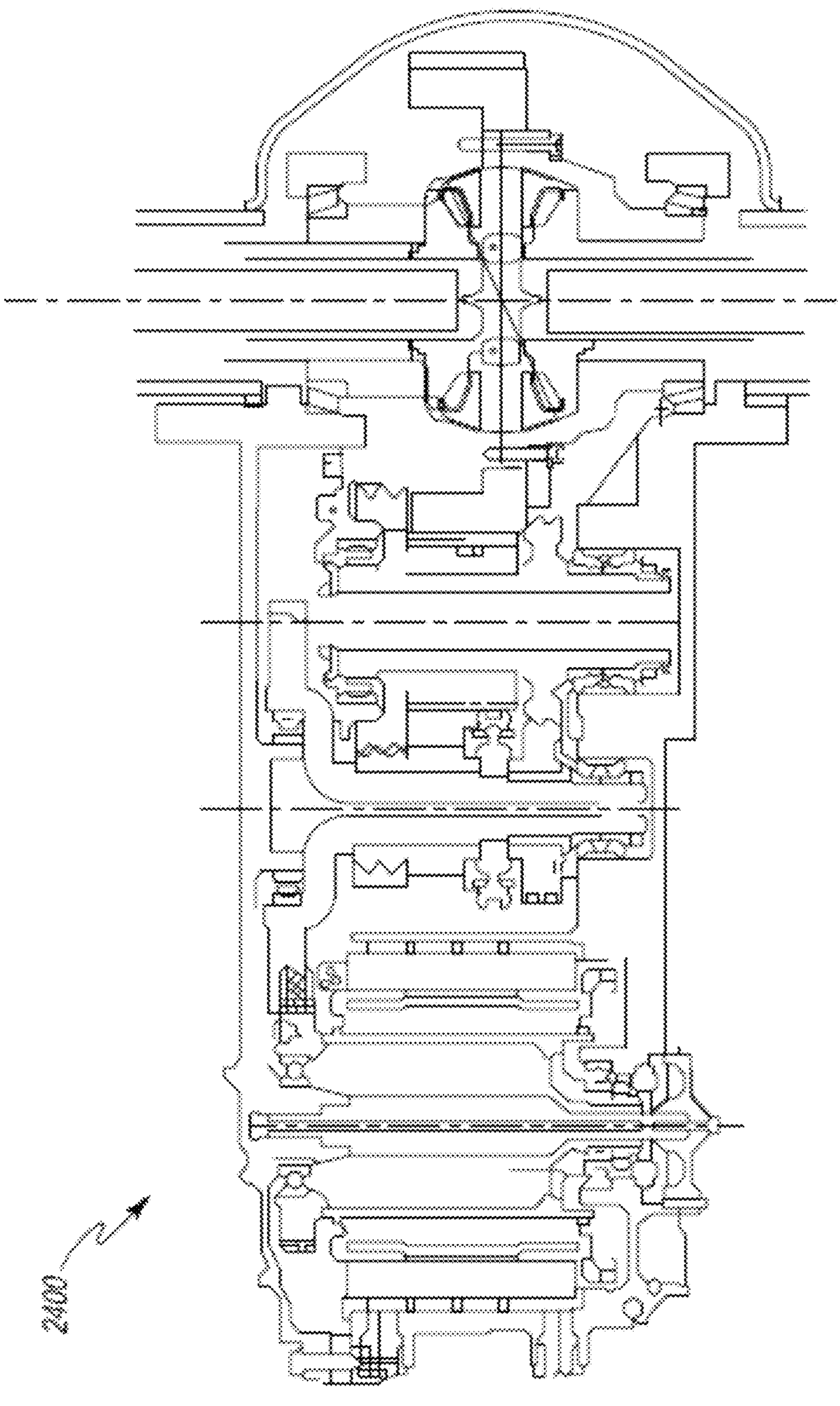
FIG. 25 is a schematic drawing of a one speed embodiment of the electrified axle assembly of FIG. 1.

As shown in FIG. 22 and discussed above, the illustrative electrified axle assembly 100 is embodied as a two-speed axle assembly and the idler shaft 1520 includes two idler gears 1522, 1524. However, in other embodiments, as shown in FIG. 23, the electrified axle assembly 100 may be embodied as a single axle assembly in which the idler shaft 1520 includes a single idler gear. In such embodiments, the idler shaft 1520 may not include a synchronizer (i.e., shift mechanism 1550). Additionally, in such embodiments, the idler shaft 1520 may still include the second idler gear, which is not engaged with the idler shaft 1520 and, as such, free spins during operation of the electrified axle assembly 100.

Figure 26:
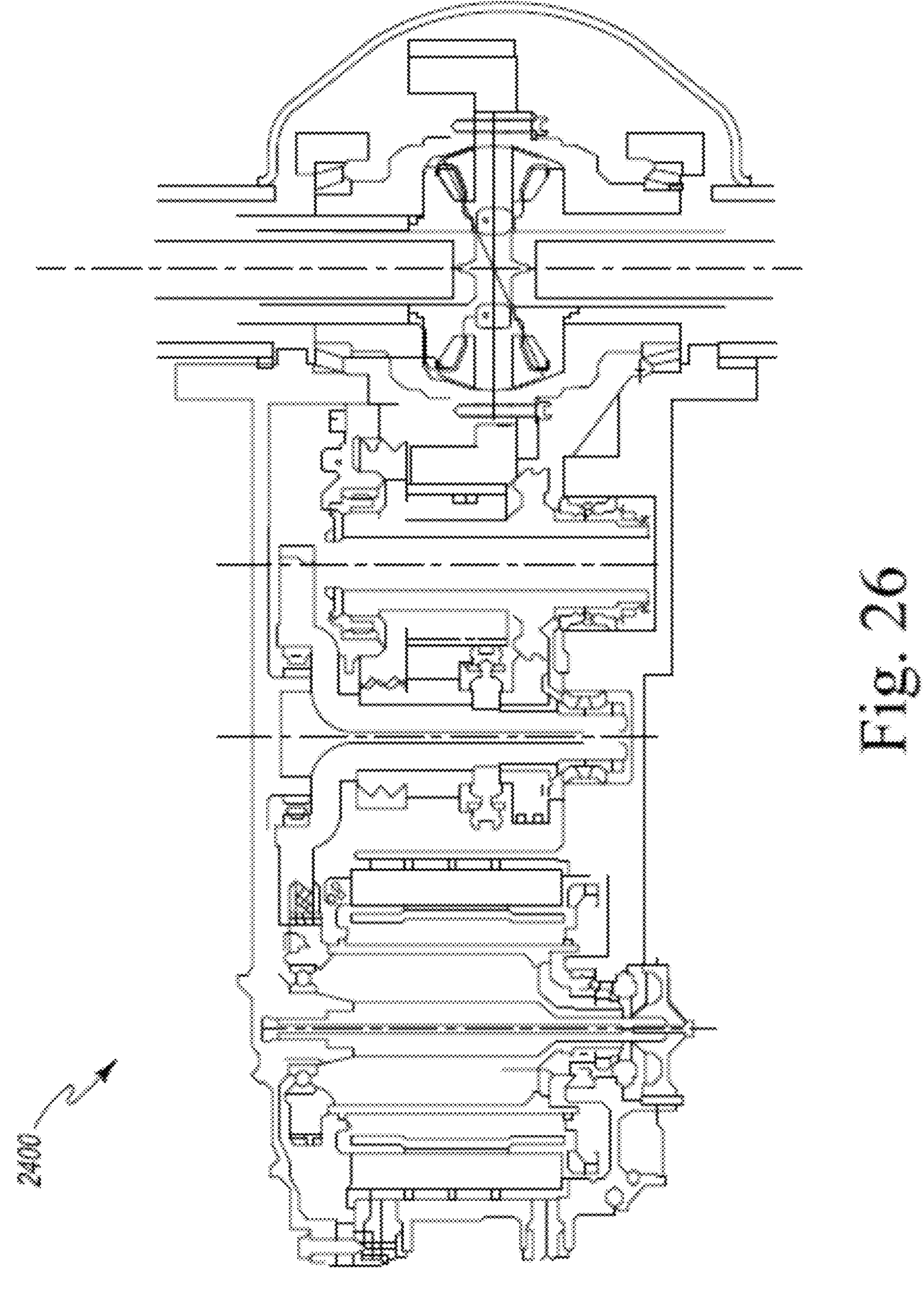
FIG. 26 is a schematic drawing of a two speed embodiment of the electrified axle assembly of FIGS. 21 and 22.
Figure 27:
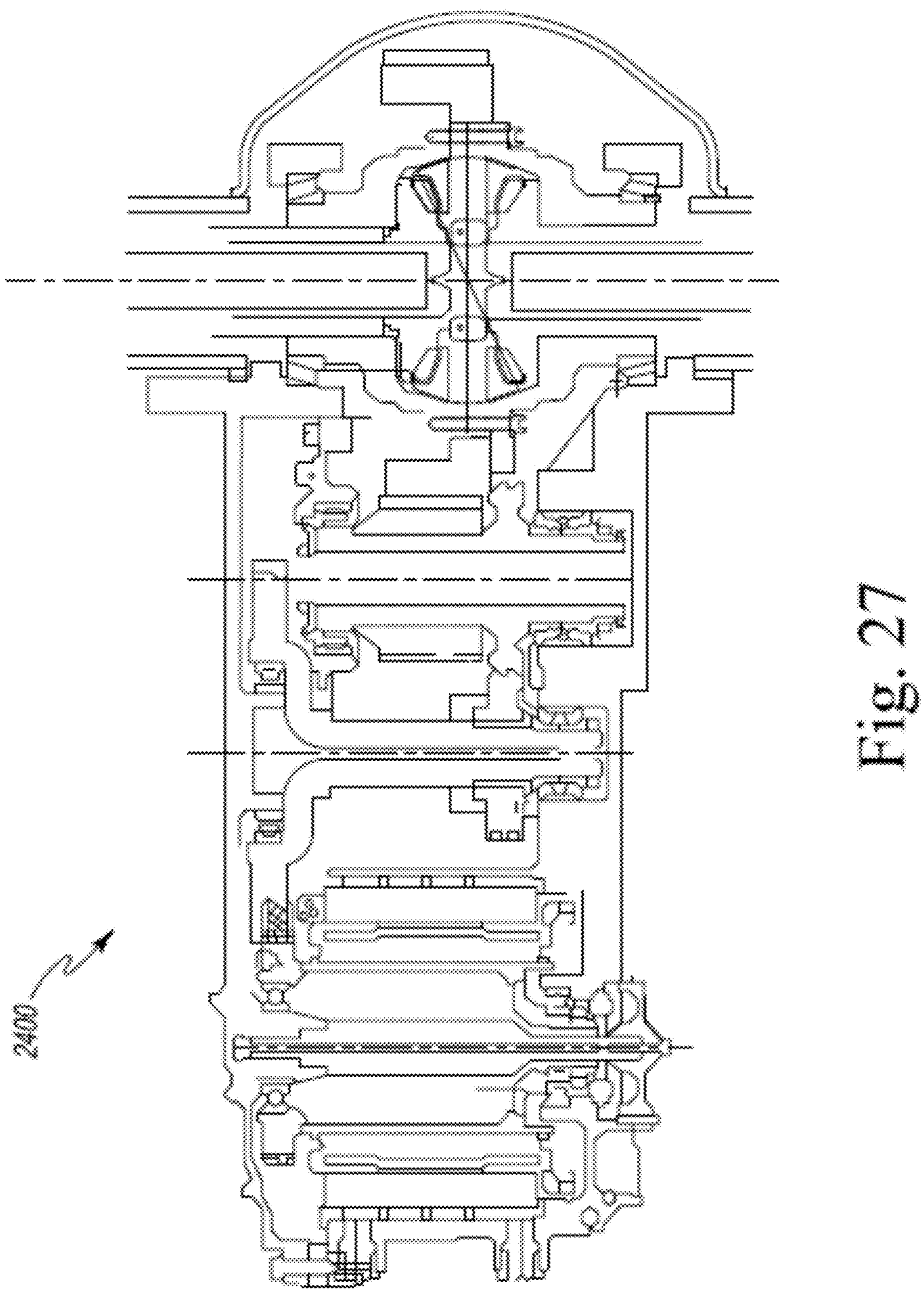
FIG. 27 is a schematic drawing of a single speed embodiment of the electrified axle assembly of FIGS. 21 and 22.

Referring now to FIGS. 24-27, in another embodiment, an electrified axle assembly 2400 includes the electric motor 1502, the idler shaft 1520, and the output shaft 1530. However, the output shaft 1530 is not coaxial with the axle axis 152, but rather offset therefrom. Additionally, the electrified axle assembly 2400 does not include the planetary gear set 1560. However, similar to the electrified axle assembly 100, the electrified axle assembly 2400 may be embodied as a two-speed axle assembly as shown in FIG. 26 or a single speed axle assembly as shown in FIG. 27. Again, as described above, the idler shaft 1520 of the electrified axle assembly 2400 may not include the second idler gear in the single speed embodiment.

Figure 28:
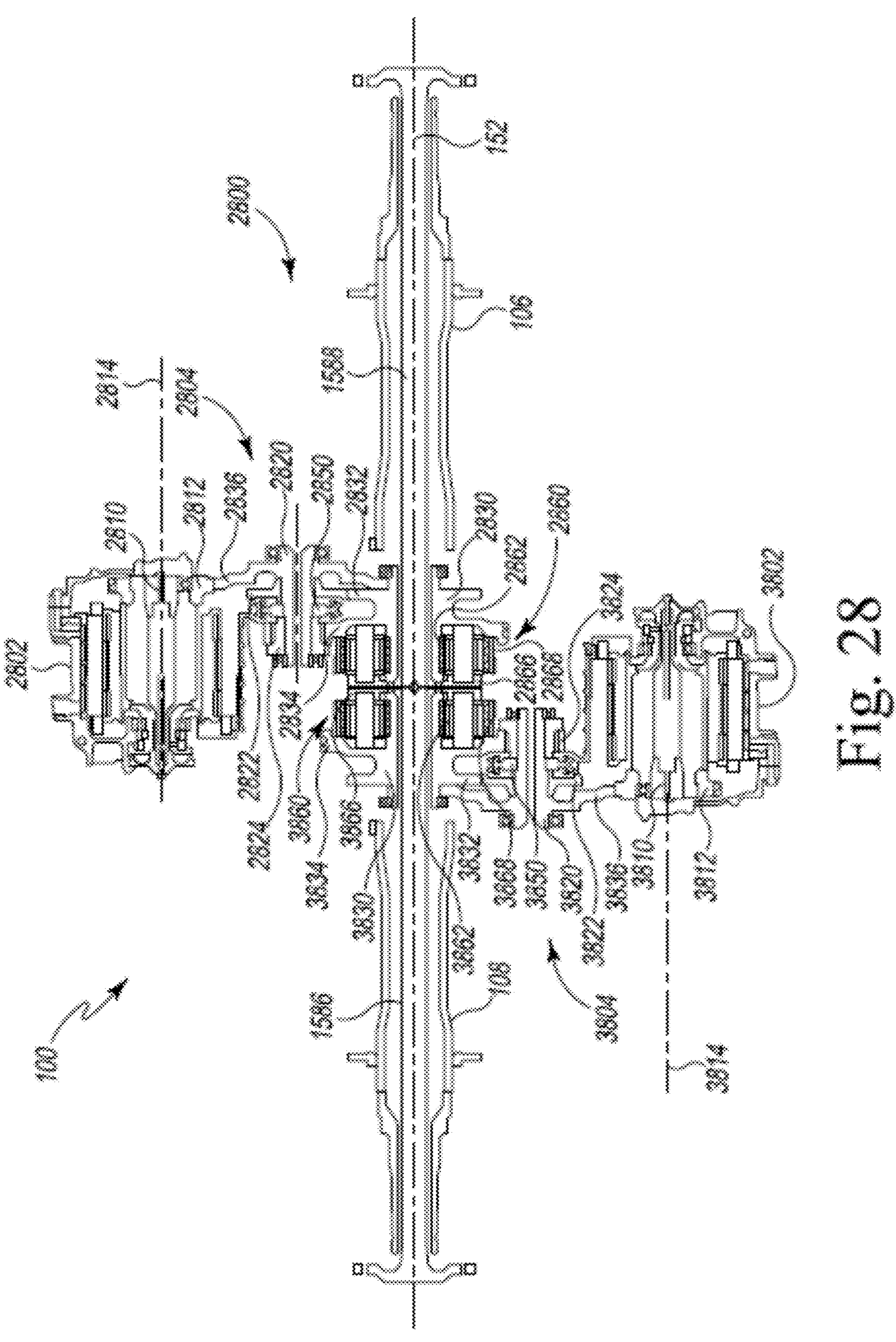
FIG. 28 is a schematic drawing of an electrified axle assembly having a dual-motor powertrain.

Referring now to FIG. 28, in yet another embodiment, the electrified axle assembly 100 may include a dual-motor powertrain 2800. The dual-motor powertrain 2800 is similar to the powertrain 1500 shown in and described above in regard to FIG. 15, except that the illustrative dual-motor powertrain 2800 includes two motors 2802, 3802 and two gear sets 2804, 3804 as shown in FIG. 28. The motors 2802, 3802 and the gear sets 2804, 3804 are coplanar with each other, with the motor 2802 and gear set 2804 located on an opposite side of the axle housings 106, 108 relative to the motor 3802 and gear set 3804. That is, the motor 2802 and gear set 2804 are located forward of the axle housings 106, 108 (e.g., toward the front of the vehicle) and the motor 3802 and the gear set 3804 are located rearward of the axle housings 106, 108 (e.g., toward the rear of the vehicle).

Each of the motors 2802, 3802 may be embodied as any type of electric motor, such as a Direct Current (DC) or Alternating Current (AC) motor, brushed or brushless, and/or other type of electric motor suitable for driving an axle assembly. The motor 2802 includes a rotor shaft 2810 extending therefrom and a pinion 2812 attached to the rotor shaft 2810. Similarly, the motor 3802 includes a rotor shaft 3810 extending therefrom and a pinion 3812 attached to the rotor shaft 3810. It should be appreciated that the rotor shaft 2810 extends along an axis 2814, and the rotor shaft 3810 extends along an axis 3814, each of which is parallel to each other and to the axle axis 152.

The gear set 2804 includes an idler shaft 2820 and an output shaft 2830, each of which is orientated parallel with the axis 2814 and the axle axis 152. The idler shaft 2820 includes a pair of idler gears 2822 and 2824 and a shift mechanism 2850, which cooperate to provide two different speeds for the electrified axle assembly 100. Each idler gear 2822, 2824 is rotatably coupled to the idler shaft 2820 and configured to mesh with a corresponding output gear 2832, 2834 of the output shaft 2830 such that a rotation of an idler gear 2822, 2824 causes rotation of the corresponding meshed output gear 2832, 2834. The idler shaft 2820 also includes a drive wheel 2836 attached at one end and meshed with the pinion 2812 of the motor 2802. As such, the drive wheel 2836 is configured to transfer torque from the drive pinion 2812 to the idler shaft 2820.

The pair of idler gears 2822, 2824 define different reduction ratios of the powertrain 2800. For example, the idler gear 2822 may correspond to a first reduction ratio, and the idler gear 2824 may correspond to a second reduction ratio. Each of the idler gears 2822, 2824 is configured to spin freely on the idler shaft 2830 such that when the corresponding reduction ratio is not engaged, no torque is transferred between the idler shaft 2820 and the corresponding idler gear 2822, 2824. The reduction ratio (i.e., the idler gear 2822, 2824) is selected via the operation of a shift mechanism 2850.

In the illustrative embodiment, the shift mechanism 2850 is embodied as a synchronizer and may include a shift ring, shift fork, and an actuator. In such embodiments, the shift ring of the shift mechanism 2850 may be slideable along the idler shaft 2820 between the idler gears 2822, 2824. The shift ring may be rotatably coupled to the idler shaft 2820 such that the shift ring and the idler shaft 2820 rotate at the same speed. The shift ring may include at least one splined portion that is engageable with a corresponding splined portion of either of the idler gears 2822, 2824. Additionally, the shift ring may define a groove configured to engage the shift fork. The shift fork may be coupled to the actuator and movable to select the first reduction ratio or the second reduction ratio. The shift fork may be engaged with the shift ring such that the shift fork is capable of moving the shift ring into engagement with one of the idler gears 2822, 2824. Additionally, the shift fork may be movable into a neutral position where neither of the idler gears 2822, 2824 are engaged with the shift ring. The actuator may be controlled manually or automatically. The actuator of the shift mechanism 2850 may be responsive to hydraulic pressure, pneumatic pressure, or electronic signals generated by a transmission control module. Alternatively, the actuator may include a mechanical linkage controlled by the vehicle operator.

The output shaft 2830 includes the pair of output gears 2832, 2834. The output gear 2832 is meshed with the idler gear 2822, and the output gear 2834 is meshed with the idler gear 2824. The output gears 2832, 2834 are rotatably fixed to the output shaft 2830 such that the output gears 2832, 2834 and the output shaft 2830 rotate at the same speed. The output shaft 2830 further includes a sun gear 2862 of a planetary gear set 2860 attached to an end opposite the output gears 2832, 2834. The planetary gear set 2860 also includes a plurality of planet gears 2864, a planet carrier 2866, and a ring gear 2868. The plurality of planet gears 2864 are rotatably coupled to the planet carrier 2866. The planet carrier 2866 is arranged adjacent to the ring gear 2868 with each planet gear 2864 disposed in the ring gear 2868. In this way, each planet gear 2864 engages both the ring gear 2868 and the sun gear 2862. Similar to the electrified axle assembly 100 of FIG. 16, the gear set 2804 may also include various sets of bearings, such as roller bearings between the output shaft 2830 and the planet carrier 2866 and tapered roller bearings at the opposing ends of the output shaft 2830 and the planet carrier 2866.

When the output shaft 2830 rotates the sun gear 2862, the sun gear 2862 rotates each planet gear 2868, which in turn rotates the planet carrier 2866. The planet carrier 2866 is coupled to the axle 1588. In this way, mechanical power provided by the electric motor 2802 is transferred through the idler shaft 2820, the output shaft 2830, the planetary gear set 2860, and to the axle 1588, which provides rotational movement of the corresponding wheel.

Similar to gear set 2804, the gear set 3804 includes an idler shaft 3820 and an output shaft, each of which is orientated parallel with the axis 3814 and the axle axis 152 such that the electrified axle assembly 100 of FIG. 28 includes eight parallel shafts. The idler shaft 3820 includes a pair of idler gears 3822 and 3824 and a shift mechanism 3850, which cooperate to provide two different speeds for the electrified axle assembly 100. Each idler gear 3822, 3824 is rotatably coupled to the idler shaft 3820 and configured to mesh with a corresponding output gear 3832, 3834 of the output shaft 3830 such that a rotation of an idler gear 3822, 3824 causes rotation of the corresponding meshed output gear 3832, 3834. The idler shaft 3820 also includes a drive wheel 3836 attached at one end and meshed with the pinion 3812 of the motor 3802. As such, the drive wheel 3836 is configured to transfer torque from the drive pinion 3812 to the idler shaft 3820.

Similar to the idler gears 2822, 2824, the pair of idler gears 3822, 3824 define different reduction ratios of the powertrain 2800. For example, the idler gear 3822 may correspond to a first reduction ratio, and the idler gear 3824 may correspond to a second reduction ratio. Each of the idler gears 3822, 3824 is configured to spin freely on the idler shaft 3820 such that when the corresponding reduction ratio is not engaged, no torque is transferred between the idler shaft 3820 and the corresponding idler gear 3822, 3824. The reduction ratio (i.e., the idler gear 3822, 3824) is selected via the operation of a shift mechanism 3850.

Similar to the shift mechanism 2850, the shift mechanism 3850 is embodied as a synchronizer in the illustrative embodiment and may include a shift ring, shift fork, and an actuator. In such embodiments, the shift ring of the shift mechanism 3850 may be slideable along the idler shaft 3820 between the idler gears 3822, 3824. The shift ring may be rotatably coupled to the idler shaft 3820 such that the shift ring and the idler shaft 3820 rotate at the same speed. The shift ring may include at least one splined portion that is engageable with a corresponding splined portion of either of the idler gears 3822, 3824. Additionally, the shift ring may define a groove configured to engage the shift fork. The shift fork may be coupled to the actuator and movable to select the first reduction ratio or the second reduction ratio. The shift fork may be engaged with the shift ring such that the shift fork is capable of moving the shift ring into engagement with one of the idler gears 3822, 3824. Additionally, the shift fork may be movable into a neutral position where neither of the idler gears 3822, 3824 are engaged with the shift ring. The actuator may be controlled manually or automatically. The actuator of the shift mechanism 3850 may be responsive to hydraulic pressure, pneumatic pressure, or electronic signals generated by a transmission control module. Alternatively, the actuator may include a mechanical linkage controlled by the vehicle operator.

The output shaft 3830 includes the pair of output gears 3832, 3834. The output gear 3832 is meshed with the idler gear 3822, and the output gear 3834 is meshed with the idler gear 3824. The output gears 3832, 3834 are rotatably fixed to the output shaft 3830 such that the output gears 3832, 3834 and the output shaft 3830 rotate at the same speed. The output shaft 3830 further includes a sun gear 3862 of a planetary gear set 3860 attached to an end opposite the output gears 3832, 3834. The planetary gear set 3860 also includes a plurality of planet gears 3864, a planet carrier 3866, and a ring gear 3868. The plurality of planet gears 3864 are rotatably coupled to the planet carrier 3866. The planet carrier 3866 is arranged adjacent to the ring gear 3868 with each planet gear 3864 disposed in the ring gear 3868. In this way, each planet gear 3864 engages both the ring gear 3868 and the sun gear 3862. Again, similar to the electrified axle assembly 100 of FIG. 16, the gear set 3804 may also include various sets of bearings, such as roller bearings between the output shaft 3830 and the planet carrier 3866 and tapered roller bearings at the opposing ends of the output shaft 3830 and the planet carrier 3866.

When the output shaft 3830 rotates the sun gear 3862, the sun gear 3862 rotates each planet gear 3864, which in turn rotates the planet carrier 3866. The planet carrier 3866 is coupled to the axle 1586. In this way, mechanical power provided by the electric motor 3802 is transferred through the idler shaft 3820, the output shaft 3830, the planetary gear set 3860, and to the axle 1586, which provides rotational movement of the corresponding wheel.

Accordingly, it should be appreciated that the motor 2802 and gear set 2804 independently drive the axle 1588, while the motor 3802 and gear set 3804 independently drive the axle 1586. As such, no differential is used in the electrified axle assembly 100 embodiment of FIG. 28. Additionally, in the illustrative embodiment, the gear ratios of the gear sets 2804, 3804 are identical, but may be different in other embodiments.

Figure 29:
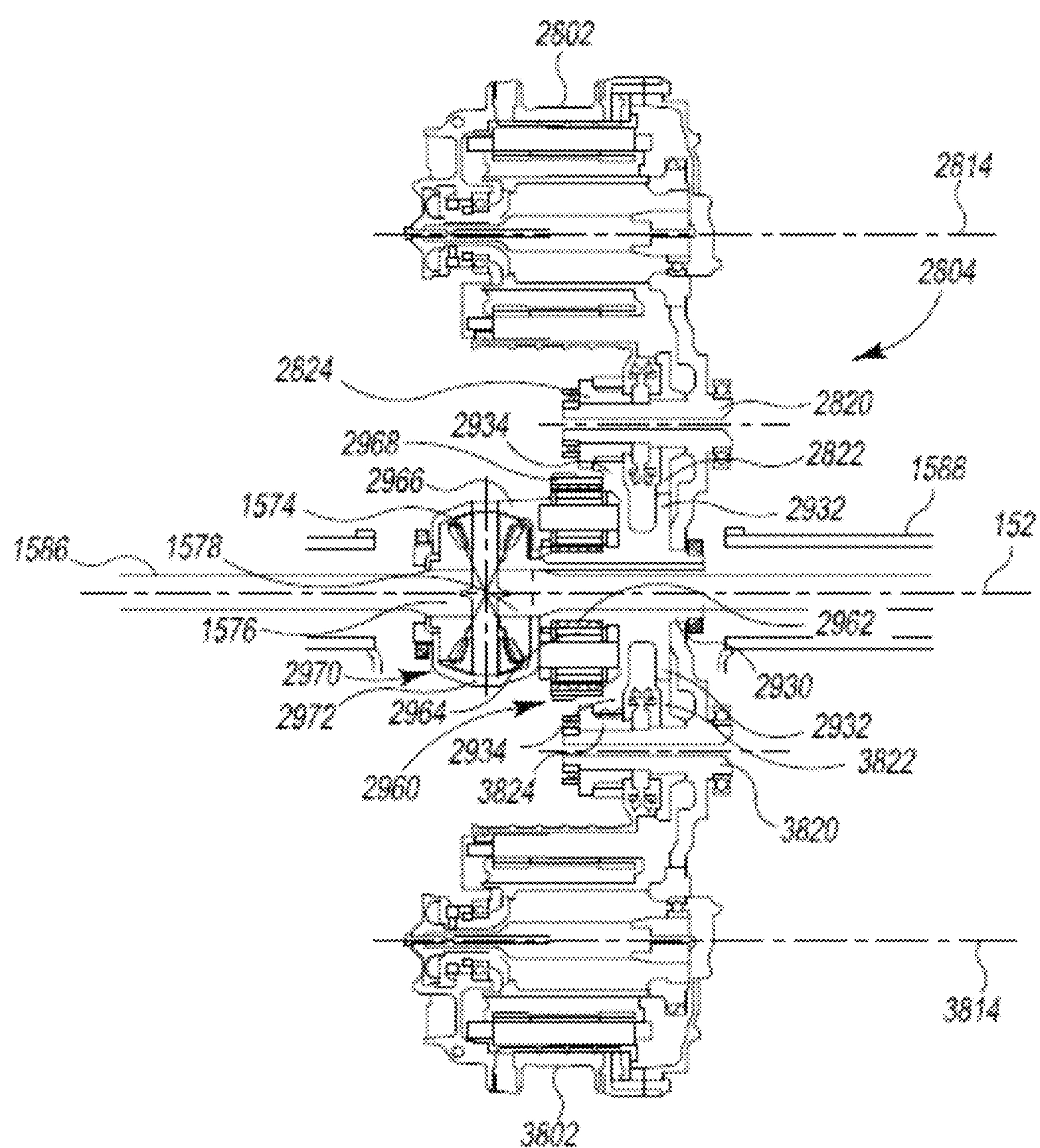
FIG. 29 is another embodiment of the electrified axle assembly of FIG. 28.

Referring now to FIG. 29, in some embodiments, the dual-motor powertrain 2800 may include two motors 2802, 3802 and the gear sets 2804, 3804 as described above in regard to FIG. 28. However, the dual-motor powertrain 2800 of FIG. 28 includes a single output shaft 2930. The axis 2814 of the motor 2902, the axis 3814 of the motor 3802, the idler shaft 2820, the idler shaft 3820, the output shaft 2930, and the axle axis 152 are orientated parallel with each other such that the electrified axle assembly 100 of FIG. 28 includes seven parallel shafts. Additionally, each of the two motors 2802, 3802, the idler shafts 2820, 3820, and the output shaft 2930 are orientated in the same lateral direction (i.e., they each face the same lateral direction).

The output shaft 2830 includes the pair of output gears 2932, 2934. The output gear 2932 is meshed with each of the idler gears 2822 of the idler shaft 2820 and the idler gear 3822 of the idler shaft 3820. Additionally, the output gear 2934 is meshed with each of the idler gears 2824 of the idler shaft 2820 and the idler gear 3824 of the idler shaft 3820. The output gears 2932, 2934 are rotatably fixed to the output shaft 2930 such that the output gears 2932, 2934 and the output shaft 2930 rotate at the same speed.

The output shaft 2930 further includes a sun gear 2962 of a planetary gear set 2960 attached to an end opposite the output gears 2932, 2934. The planetary gear set 2960 also includes a plurality of planet gears 2964, a planet carrier 2966, and a ring gear 2968. The plurality of planet gears 2964 are rotatably coupled to the planet carrier 2966. The planet carrier 2966 is arranged adjacent to the ring gear 2968 with each planet gear 2964 disposed in the ring gear 2968. In this way, each planet gear 2964 engages both the ring gear 2968 and the sun gear 2962. Again, similar to the electrified axle assembly 100 of FIG. 16, the gear sets 2804, 3804 may also include various sets of bearings, such as roller bearings between the output shaft 2930 and the planet carrier 2966 and tapered roller bearings at the opposing ends of the output shaft 9830 and the planet carrier 9866.

When the output shaft 2930 rotates the sun gear 2962, the sun gear 2962 rotates each planet gear 2964, which in turn rotates the planet carrier 2966. The planet carrier 2966 forms the differential case 2972 of a differential 2970. The differential 2970 is coupled to the axles 1586, 1588 and allows each of the wheel ends 130, 132 to rotate at different speeds, which facilitates better handling of the associated vehicle. The differential 2970 includes a pair of differential pinions 2974 rotatably coupled to the differential case 2972, which are meshed with the splined ends 1576, 1578 of the axles 1586, 1588. In this way, mechanical power provided by each electric motor 2802, 3802 is transferred through the corresponding idler shafts 2820, 3820, the output shaft 2930, the planetary gear set 2960, and the differential 2970 to the axles 1586, 1588, which provide rotational movement of the corresponding wheels.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and/or systems described herein. It will be noted that alternative embodiments of the methods, apparatuses, and/or systems of the present disclosure may not include all of the features described yet still benefit from at least some of the advantages of such features. Those of ordinary skill in the art may readily devise their own implementations of the methods, apparatuses, and/or systems that incorporate one or more of the features of the present invention and fall within the spirit and scope of the present disclosure as defined by the appended claims.

The invention claimed is:

1. An electrified axle assembly comprising:
- a motor including a pinion;
- an idler shaft including a drive wheel meshed with the pinion of the motor and a first idler gear, wherein the first idler gear is configurable between an unengaged state in which the first idler gear is configured to rotate freely on the idler shaft and an engaged state in which the idler gear rotates with the idler shaft;
- an output shaft having a first output gear meshed with the first idler gear in each of the unengaged state and the engaged state, wherein the first idler gear cooperates with the first output gear to define a first gear ratio of the electrified axle assembly;
- a planetary gear set mechanically coupled between the output shaft and an axle, wherein the output shaft forms a portion of the planetary gear set; and
- a differential mechanically coupled to the planetary gear set.

2. The electrified axle assembly of claim 1, wherein the motor defines a first axis, the idler shaft defines a second axis, and the output shaft defines a third axis, and wherein each of the first, second, and third axes is coplanar with each other.

3. The electrified axle assembly of claim 1, further comprising a shift mechanism operable to selectively configure the first idler gear into one of the unengaged state or the engaged state.

4. The electrified axle assembly of claim 3, wherein the shift mechanism includes a shift ring slidable along the idler shaft and coupled to the idler shaft such that the shift ring rotates with the idler shaft.

5. The electrified axle assembly of claim 4, wherein the shift ring includes a spline portion configured to engage a spline portion of the first idler gear when the shift mechanism configures the first idler gear into the engaged state.

6. The electrified axle assembly of claim 1, wherein the idler shaft further includes a second idler gear that is configurable between an unengaged state in which the second idler gear is configured to rotate freely on the idler shaft and an engaged state in which the second idler gear rotates with the idler shaft, wherein the first idler gear is in the unengaged state when the second idler gear is in the engaged state and wherein the second idler gear is in the ungagged state when the first idler gear is in the engaged state, and
- the output shaft further includes a second output gear meshed with the second idler gear in each of the unengaged state and the engaged state of the second idler gear, wherein the second idler gear cooperates with the second output gear to define a second gear ratio of the electrified axle assembly different from the first gear ratio.

7. The electrified axle assembly of claim 6, further comprising a shift mechanism operable to individually configure the first and second idler gears into the unengaged and engaged states, wherein the shift mechanism includes a shift ring positioned on and movable along the idler shaft between the first idler gear and the second idler gear, the shift ring being coupled to the idler shaft such that shift ring rotates with the idler shaft.

8. The electrified axle assembly of claim 7, wherein the shift ring includes a spline portion configured to engage a spline portion of the first idler gear when the shift mechanism configures the first idler gear into the engaged state and to engage a spline portion of the second idler gear when the shift mechanism configures the second idler gear into the engaged state.

9. The electrified axle assembly of claim 1, wherein the output shaft further includes a sun gear of the planetary gear set, and wherein the planetary gear set further includes a plurality of planet gears meshed with the sun gear of the output shaft and a ring gear of the planetary gear set.

10. The electrified axle assembly of claim 9, further comprising a pair of roller bearings positioned between the output shaft and a planet carrier of the planetary gear set.

11. An electrified axle assembly comprising:

an axle;

a motor including a pinion;

an idler shaft including a drive wheel meshed with the pinion of the motor, a first idler gear, and a second idler gear, wherein (i) the first idler gear is configurable between an unengaged state in which the first idler gear is configured to rotate freely on the idler shaft and an engaged state in which the idler gear rotates with the idler shaft and (ii) the second idler gear is configurable between an unengaged state in which the second idler gear is configured to rotate freely on the idler shaft and an engaged state in which the second idler gear rotates with the idler shaft, wherein the first idler gear is in the unengaged state when the second idler gear is in the engaged state and wherein the second idler gear is in the ungagged state when the first idler gear is in the engaged state;

an output shaft having a first output gear meshed with the first idler gear in each of the unengaged state and the engaged state of the first idler gear and a second output gear meshed with the second idler gear in each of the unengaged state and the engaged state of the second idler gear, wherein the first idler gear cooperates with the first output gear to define a first gear ratio and the second idler gear cooperates with the second output gear to define a second gear ratio different from the first gear ratio;

a shift mechanism operable to individually configure the first and second idler gears into the unengaged and engaged states, wherein the shift mechanism includes a shift ring positioned on and movable along the idler shaft between the first idler gear and the second idler gear, the shift ring being coupled to the idler shaft such that shift ring rotates with the idler shaft;

a planetary gear set mechanically coupled between the output shaft and the axle, wherein the output includes a sun gear of the planetary gear set, and wherein the planetary gear set further includes a plurality of planet gears meshed with the sun gear of the output shaft and a ring gear of the planetary gear set; and a differential mechanically coupled to the planetary gear set.

12. The electrified axle assembly of claim 11, wherein the motor defines a first axis, the idler shaft defines a second axis, and the output shaft defines a third axis, and wherein each of the first, second, and third axes is coplanar with each other.

13. The electrified axle assembly of claim 11, wherein the shift ring includes a spline portion configured to engage a spline portion of the first idler gear when the shift mechanism configures the first idler gear into the engaged state.

14. The electrified axle assembly of claim 11, wherein the shift ring includes a spline portion configured to engage a spline portion of the first idler gear when the shift mechanism configures the first idler gear into the engaged state and to engage a spline portion of the second idler gear when the shift mechanism configures the second idler gear into the engaged state.

15. The electrified axle assembly of claim 1, wherein a portion of the planetary gear set forms a portion of the differential.

16. The electrified axle assembly of claim 10, wherein the planet carrier of the planetary gear set forms a differential case of the differential.

17. The electrified axle assembly of claim 11, wherein a portion of the planetary gear set forms a portion of the differential.

18. The electrified axle assembly of claim 17, wherein a planet carrier of the planetary gear set forms a differential case of the differential.

* * * * *